(12) United States Patent
Nagase et al.

(10) Patent No.: US 10,073,469 B2
(45) Date of Patent: Sep. 11, 2018

(54) FLOW METER AND FLOW CONTROL DEVICE PROVIDED THEREWITH

(71) Applicant: FUJIKIN INCORPORATED, Osaka (JP)

(72) Inventors: Masaaki Nagase, Osaka (JP); Nobukazu Ikeda, Osaka (JP); Kouji Nishino, Osaka (JP); Ryousuke Dohi, Osaka (JP); Atsushi Hidaka, Osaka (JP); Katsuyuki Sugita, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 244 days.

(21) Appl. No.: 15/028,127

(22) PCT Filed: Oct. 21, 2014

(86) PCT No.: PCT/JP2014/005322
§ 371 (c)(1),
(2) Date: Apr. 8, 2016

(87) PCT Pub. No.: WO2015/064050
PCT Pub. Date: May 7, 2015

(65) Prior Publication Data
US 2016/0239026 A1  Aug. 18, 2016

(30) Foreign Application Priority Data

Oct. 28, 2013 (JP) ................. 2013-223018

(51) Int. Cl.
*F16K 31/02* (2006.01)
*G05D 7/06* (2006.01)
*G01F 1/34* (2006.01)
*F16K 31/00* (2006.01)
(Continued)

(52) U.S. Cl.
CPC ......... *G05D 7/0647* (2013.01); *F16K 31/004* (2013.01); *F16K 31/06* (2013.01);
(Continued)

(58) Field of Classification Search
CPC .......... F16K 31/004; F16K 31/06; G01F 1/34; G01F 1/363; G01F 1/42; G01F 1/6847; G01F 15/002; G01F 15/005; G01F 15/04
(Continued)

(56) References Cited

U.S. PATENT DOCUMENTS 8,265,888 B2 * 9/2012 Chung ...................... G01F 1/34
137/2
9,523,435 B2 * 12/2016 Monkowski ......... G05D 7/0635
(Continued)

FOREIGN PATENT DOCUMENTS

JP      2635929 B2    7/1997
JP      2982003 B2    11/1999
(Continued)

OTHER PUBLICATIONS

International Search Report; PCT/JP2014/005322 dated Jan. 27, 2015.

*Primary Examiner* — Minh Le
(74) *Attorney, Agent, or Firm* — Studebaker & Brackett PC

(57) ABSTRACT

A flow meter includes an inlet side switching valve, an outlet side switching valve on a downstream of the inlet side valve, and a control valve on a downstream of the outlet side valve that are connected with each other by flow passages having internal volumes, a pressure sensor on an upstream side of the control valve, and a larger flow rate measuring section for calculating a flow rate based on a build-down volume of an internal volume of the passage between an outlet of the inlet side valve and an inlet of the control valve, and a smaller flow rate measuring section for calculating a flow rate based on a build-down volume of an inner capacity of the passage between an outlet of the outlet side valve and the inlet of the control valve.

16 Claims, 18 Drawing Sheets

(51) Int. Cl.
*F16K 31/06* (2006.01)
*G01F 1/36* (2006.01)
*G01F 1/42* (2006.01)
*G01F 1/684* (2006.01)
*G01F 15/00* (2006.01)
*G01F 15/04* (2006.01)

(52) U.S. Cl.
CPC ............... *G01F 1/34* (2013.01); *G01F 1/363* (2013.01); *G01F 1/42* (2013.01); *G01F 1/6847* (2013.01); *G01F 15/002* (2013.01); *G01F 15/005* (2013.01); *G01F 15/04* (2013.01)

(58) Field of Classification Search
USPC ..................................................... 137/487.5
See application file for complete search history.

(56) References Cited

U.S. PATENT DOCUMENTS

| | | | |
|---|---|---|---|
| 9,638,560 B2* | 5/2017 | Nagase | G01F 1/34 |
| 9,791,867 B2* | 10/2017 | Nagase | G05D 7/0635 |
| 2006/0008328 A1* | 1/2006 | Morgan | G05D 7/0635 406/10 |
| 2009/0183548 A1* | 7/2009 | Monkowski | G01F 25/0038 73/1.35 |
| 2009/0292399 A1* | 11/2009 | Nagase | G01F 1/36 700/282 |
| 2010/0125424 A1* | 5/2010 | Ding | G01F 25/0053 702/47 |
| 2010/0139775 A1* | 6/2010 | Ohmi | G01F 1/363 137/12 |
| 2015/0136248 A1 | 5/2015 | Nagase et al. | |
| 2016/0252913 A1* | 9/2016 | Hirata | F16K 31/02 137/486 |

FOREIGN PATENT DOCUMENTS

| | | | |
|---|---|---|---|
| JP | 2003-195948 A | 7/2003 |
| JP | 4137666 B2 | 8/2008 |
| JP | 4308356 B2 | 8/2009 |
| JP | 5847106 B2 | 1/2016 |
| WO | 2013/179550 A1 | 12/2013 |
| WO | 2014/156042 A1 | 10/2014 |

* cited by examiner

FLOW METER AND FLOW CONTROL DEVICE PROVIDED THEREWITH

TECHNICAL FIELD

The present invention relates to improvements in flow rate control devices provided with flow rate monitors, and more particularly, the present invention relates to a flow rate range switching type build-down flow meter and a flow rate control device provided with the flow rate range switching type flow rate monitor including a flow rate control device having a pressure fluctuation resistance characteristic and a build-down type flow rate monitor that are organically combined, and by which a control flow rate of the flow rate control device can be monitored in real time and also highly precise flow rate monitoring can be conducted for a wider flow rate range by properly switching a build-down capacity of the build-down type flow rate monitor depending on a flow rate range of fluid to be controlled.

BACKGROUND ART

Conventionally, a thermal-type flow rate control device MFC or a pressure-type flow rate control device FCS has been commonly used in gas supplying devices for semiconductor manufacturing equipment. In particular, as shown in FIG. 20, the latter pressure-type flow rate control device FCS has a control valve CV, a temperature detector T, a pressure detector P, an orifice OR, and a computing control section CD including a temperature correction/flow rate computing circuit CDa, a comparison circuit CDb, an input/output circuit CDc, and an output circuit CDd for a superior flow characteristic that realizes stable flow rate control even in a large fluctuation of a supply pressure at a primary side.

In other words, in the pressure-type flow rate control device FCS shown in FIG. 20, detection values from the pressure detector P as well as the temperature detector T are inputted to the temperature correction/flow rate computing circuit CDa for conducting temperature correction for the detected pressure and flow rate calculation, and then a computed flow rate value Qt is inputted to the comparison circuit CDb. An input signal Qs corresponding to a predetermined flow rate is also inputted from a terminal In and then entered to the comparison circuit CDb via the input output circuit CDc for comparing the signal to the computed flow rate value Qt from the temperature correction/flow rate computing circuit CDa. Then in case the set flow rate input signal Qs is larger than the computed flow rate value Qt, a control signal Pd is outputted to a driving section of the control valve CV. The control valve CV is then accordingly driven to a closing direction till a difference between the set flow rate input signal Qs and the computed flow rate value Qt (Qs−Qt) becomes zero.

In the pressure-type flow rate control device FCS, when a so-called critical expansion condition in which a relationship between a downstream side pressure $P_2$ at a downstream side of the orifice OR and an upstream side pressure $P_1$ at an upstream side of the orifice OR is represented by a formula: $P_1/P_2 \geq$ about 2 is kept, a flow rate Q of gas flowing through the orifice OR is represented by a formula: $Q=KP_1$ (here, K is a constant), and when the critical expansion condition is not met, the flow rate Q of the gas flowing through the orifice OR is represented by a formula: $Q=KP_2^m(P_1-P_2)^n$ (here, K, m, and n are constants). Thus the flow rare Q can be controlled with high precision by controlling the pressure $P_1$ and furthermore, a superior characteristic of maintaining the control flow rate value without fluctuations even in a great change of a pressure of gas Go at an upstream side of the control valve can be achieved.

As the pressure-type flow rate control device FCS is already well-known, it is not described in detail here. (Japanese Unexamined Patent Application Publication No. 2003-195948 etc.)

However, change of a hole diameter of the orifice OR due to aging is inevitable because the hole diameter of the orifice OR used in the pressure-type flow rate control device of this kind is small. Then, as a result, a difference is generated between the set flow rate (i.e. control flow rate value) by the pressure-type flow rate control device FCS and an actual flow rate of the gas Go flowing through the orifice OR. Additionally, frequent monitoring of the flow rate during the flow rate control which is required for detecting the difference significantly affects operation performance of the semiconductor manufacturing equipment and/or quality of the semiconductor manufactured.

Therefore, in the field of the pressure-type flow rate control device, measures have been taken for preventing generation of the difference between the control flow rate value by the pressure-type flow rate control device FCS and the actual flow rate of the gas Go flowing through the orifice OR by detecting change of the hole diameter of the orifice OR as early as possible, and a gas flow rate monitor using so-called build-up system (ROR: RATE OF RISE measurement technique) and/or build-down system (ROD: RATE OF DECAY measurement technique) is commonly used for detecting change of the hole diameter of the orifice of this kind.

On the other hand, the build-up type and/or the build-down type gas flow rate monitor causes problems such as lower operation rate of the semiconductor manufacturing equipment and variation in quality of the manufactured semiconductors because the gas with the control flow rate that is actually supplied needs to be temporally stopped for gas flow rate measurement for the monitoring.

Therefore, in recent years, as such the flow rate control device, a flow rate control device provided with a flow rate monitor that can easily and precisely monitor whether the flow rate control of the supply gas is appropriately conducted in real time without temporally stop of the actual gas supply has been under development.

FIG. 21 shows an example of a conventional flow rate monitor, and a flow rate control device provided with the flow rate monitor 20 is the pressure-type flow rate control device combined with a thermal-type mass flow rate sensor 25 that includes a flow passage 23, a first pressure sensor 27a for detecting a pressure at an inlet side, an opening and closing control valve 24, the thermal-type mass flow rate sensor 25, a second pressure sensor 27b, a throttle (sonic nozzle) 26, a computing control section 28a, and an input/output circuit 28b.

In other words, the thermal-type mass flow sensor 25 includes a flow straightening body 25a, a branched passage 25b for a flow with a predetermined flow rate of F/A branched from the flow passage 23, and a sensor body 25c provided to the branched passage 25b, and outputs a flow rate signal Sf which represents a total flow rate F. Here, the throttle 26 is a sonic nozzle that distributes fluid flow with a flow rate relative to a pressure at an upstream side of the throttle 26 when a pressure difference between the pressure at the upstream side of the throttle 26 and a pressure at a downstream side of the throttle 26 is no lower than a predetermined value (i.e. under a critical condition), and reference signs SPa and SPb designate pressure signals, reference signs Pa and Pb designate pressures, the reference sign F designates the total flow rate, the reference sign Sf designates the flow rate signal, and a reference sign Cp designates a valve opening degree control signal.

The computing control section 28a performs feedback control of the opening and closing control valve 24 by feeding back the pressure signals SPa and SPb outputted from the pressure sensors 27a and 27b and the flow rate signal Sf outputted from the flow rate sensor 25 to output the valve opening degree control signal Cp.

In other words, a flow rate setting signal Fs is inputted to the computing control section 28a from the input/output circuit 28b for adjusting the flow rate F of the fluid flowing into the mass flow rate control device 20 to make the flow rate F match the flow rate setting signal Fs. More specifically, the computing control section 28a controls the flow rate F of the fluid that flows through the sonic nozzle 26 by conducting feedback control of the opening and closing of the opening and closing control valve 24 using the output from the second pressure sensor 27b (the pressure signal SPb), and measures the actual flow rate F using the output from the thermal-type flow rate sensor 25 (the flow rate signal Sf) at that time for checking an operation of the mass flow rate control device 20.

As described above, since the computing control section 28a included in the flow rate control device provided with the flow rate monitor 20 shown in FIG. 21 can conduct the pressure-type flow rate control in which an opening degree of the opening and closing control valve 24 is adjusted based on the pressure signal Spb from the second pressure sensor 27b as well as the flow rate measurement in which the actual flow rate is monitored by the thermal-type mass flow sensor 25, real time monitoring of the gas to check whether the gas actually flows at the control flow rate corresponding to the predetermined flow rate Fs, or in other words, whether there is a difference between the control flow rate and the actual flow rate can be conducted and it realizes a high practicality.

However, the flow rate control device provided with the flow rate monitor 20 shown in FIG. 21 still has many problems to be solved. Firstly, the device can alert the occurrence of the difference between the monitoring flow rate (actual flow rate) and the control flow rate by an alarm or the like in case there is the difference though the device cannot automatically correct the control flow rate or adjust the predetermined flow rate value Fs. Therefore, in case correction of the control flow rate value delays due to some cause such as an absence of an operator, gas with a different flow rate (flow with an actual flow rate) which doesn't match the control flow rate is continuously supplied and various inconveniences arise in semiconductor production.

Secondly, the flow rate control device provided with the flow rate monitor 20 has a complicated structure because the two different types of flow rate measurements, pressure-type flow rate measuring using the second pressure sensor 27b for flow rate control and measuring using the thermal-type flow rate sensor 25 for flow rate monitoring are conducted therein. The structure complexity of the device makes downsizing and production cost reduction of the device impossible.

Thirdly, the computing control section 28a is configured to perform the opening and closing control of the opening and closing control valve 24 using the both signals of the output SPb of the second pressure sensor 27b and the flow rate output Sf of the thermal-type flow rate sensor 25, and to correct the flow rate output Sf of the thermal-type flow rate sensor 25 using the output SPa of the first pressure sensor 27a. In other words, the opening and closing control of the opening and closing control valve 24 is performed using the total three signals, the two pressure signals from the first pressure sensor 27a as well as the second pressure sensor 27b and the flow rate signal from the thermal-type flow rate sensor 25. Therefore the configuration of the computing control section 28a is complicated and a stable flow rate control characteristic as well as an excellent high responsiveness of the pressure-type flow rate control device FCS are impaired.

On the other hand, to solve the previously mentioned problems, the present inventors have developed a pressure-type flow rate control device provided with a flow rate monitor that has a pressure-type flow rate control device FCS and a build-down type flow rate measuring section positioned at an upstream side of the pressure-type flow rate control device FCS that are integrally combined, and the build-down type flow rate measuring section operates within a pressure variation range that is allowed as a pressure at the upstream side (input side pressure) of the flow rate control device and outputs a flow rate monitoring signal from the build-down type flow rate measuring section at least once per second (preferably more than once per second) for simultaneously conducting flow rate control by the pressure-type flow rate control device as well as flow rate monitoring which is practically close to real monitoring by the build-down type flow rate measuring section, and in case a difference between a monitoring flow rate value and a control flow rate value excesses a prescribed value, the predetermined flow rate value of the pressure-type flow rate control device is automatically adjusted for matching the control flow rate value of the pressure-type flow rate control device with the flow rate value measured by the build-down type flow rate measuring section.

In other words, the newly developed pressure-type flow rate control device provided with the build-down type flow rate monitor can perform flow rate monitoring roughly in real time (monitoring at least once per second) with the build-down type flow rate monitoring section by making full use of a flow rate characteristic of the pressure-type flow rate control device that the flow rate control characteristic thereof is not almost affected by the pressure fluctuation at the input side, and simplification of the computing control section, significant downsizing of a device body section, and improvement of gas replacement characteristic have been made possible.

Hereinafter, firstly referring to FIG. 5 to FIG. 19, the pressure-type flow rate control device provided with the build-down type flow rate monitor shown in FIG. 21 which is a foundation of the present invention will be explained. FIG. 5 is a block diagram of a configuration of a testing device for measuring a flow rate monitoring characteristic of the pressure-type flow rate control device provided with the build-down type flow rate monitor. The present inventors used the testing device for conducting a fundamental test on the build-down type flow rate measurement in which a flow rate is calculated based on a degree of pressure drop between the pressure-type flow rate control device FCS and a primary side opening and closing switching valve (upstream side valve) AV.

Here, in FIG. 5, a reference sign $N_2$ designates a gas supply source, a reference sign RG designates a pressure regulator, a reference sign ECV designates an electromagnetic driving section, the reference sign AV designates the primary side opening and closing switching valve (upstream side valve), a reference sign FCS designates the pressure-type flow rate control device, a reference sign VP designates a vacuum pump, a reference sign BC designates a build-down capacity, a reference sign T designates a temperature sensor, a reference sign P designates a pressure sensor provided to a primary side of a control valve in the pressure-type flow rate control device FCS, a reference sign $P_O$ designates an output of the pressure sensor, a reference sign E designates a power source section, a reference sign $E_1$ designates a power source for the pressure-type flow rate control device, a reference sign $E_2$ designates a power source for the computing control section, a reference sign $E_3$ designates a power source for the primary side opening and closing switching valve (upstream side valve), a reference sign S designates a signal generator, a reference sign CP designates a computing control section, a reference sign CPa designates a pressure-type flow rate computing control section, a reference sign CPb designates a build-down monitoring flow rate computing control section, a reference signal PC designates a computing display section, and a reference signal NR designates a data logger.

The build-down capacity BC corresponds to a volume of an empty space in a pipeline connecting an outlet side of the primary side opening and closing switching valve (upstream side valve) AV and an inlet side of the control valve in the pressure-type flow rate control device FCS (not shown), and the internal volume V of the build-down capacity BC may be switched to volumes of 1.78 cc, 9.91 cc, 4.6 to 11.6 cc, and 1.58 cc to 15.31 cc by adjusting a length and/or an inner diameter of the pipeline or an internal volume of a build-down chamber provided to the pipeline.

Here, the inner diameter of the pipeline between the outlet of the primary side opening and closing switching valve (upstream side valve) AV and the inlet of the control valve CV is configured to be 1.8 mm and the internal volume V of the build-down capacity BC is configured to be 1.58 to 15.31 cc.

As described later, in the build-down monitoring flow rate computing control section CPb in the computing control section CP, calculation of a monitoring flow rate is conducted using a pressure drop rate in the build-down capacity BC and further, calculation of a flow rate of gas passing through an orifice (not shown) as well as opening and closing control of the control valve (not shown) are conducted in the pressure-type flow rate computing control section CPa as the same as in the computing control section of the conventional pressure-type flow rate control device FCS.

Since all the devices or the like such as the pressure-type flow rate control device FCS, the primary side opening and closing switching valve (upstream side valve) AV, and the pressure regulator RG are publically known, those are not explained. Here, a piezoelectric driven metal diaphragm valve is used as the primary side opening and closing switching valve (upstream side valve) AV which needs to be opened and closed in a short time though a linear motion electromagnetic valve and/or an air controlled valve with a pilot solenoid valve may be used as well.

A reason why the build-down type flow rate measuring section can be positioned at the upstream side of the pressure-type flow rate control device FCS is, as previously described, because the pressure-type flow rate control device FCS with the orifice is less subject to fluctuation of gas supply pressure. Also it is known that the build-down system can achieve flow rate measurement with high precision.

In the build-down system, a flow rate Q of gas flowing through the build-down capacity BC with the internal volume V (1) is calculated by the following formula (1).

$$Q(sccm) = \frac{1(atm)}{760(Torr)} \times 1000(cc/l) \times 60 \quad \text{[Formula 1]}$$
$$(\text{sec/min}) \times \frac{273(K)}{(273+T)(K)} \times V(l) \times \frac{\Delta p(Torr)}{\Delta t(\text{sec})}$$

Here, the sign V represents the internal volume (1) of the build-down capacity BC, the sign $\Delta P/\Delta t$ represents the pressure drop rate in the build-down capacity V, and the sign T represents a temperature of the gas (° C.).

First, flow rate measurement by the build-down system was conducted using the testing device illustrated in FIG. 5 with the upstream side of the pressure-type flow rate control device FCS set at 400 kPa abs, the pressure drop (pressure difference $\Delta P$) set at no less than 50 kPa abs, and the internal volume V of the build-down capacity BC set at 4.6 to 11.6 cc.

FIG. 6 shows the pressure drop status at that time. The flow rate was measured relatively precisely though output of the measured flow rate was discontinuous due to required pressure recovery time (a) and it was found that time required per cycle was several seconds or more.

In other words, when the pressure recovery time (a) is the time required for the pressure to become a prescribed value or higher with the primary side opening and closing switching valve (upstream side valve) AV being opened, and available time for flow rate output (b) is a time required for the pressure to become a prescribed value or lower, a proportion of (a) and (b) determines a proportion of the time for the measured flow rate output. It was found that, since the available time for flow rate output (b) is determined by the control flow rate of the FCS, the internal volume V of the build-down capacity, and the pressure drop range $\Delta P$, the control flow rate of the FCS, the internal volume V of the build-down capacity, and the pressure drop range $\Delta P$ need to be strictly examined to be set at proper values, or the build-down type flow rate measurement cannot be close to the real-time flow monitoring.

Ideally, continuous flow rate output is a must for real-time flow rate monitoring, though it is possible to achieve nearly real-time monitoring in actual operations of semiconductor manufacturing equipment or the like if the flow rate output is obtained at least once per second.

Accordingly, the present inventors got an idea to make the pressure difference $\Delta P$ as well as the internal volume V of the build-down capacity smaller to shorten the time required for refilling the gas (the pressure recovery time (a)) to achieve nearly real-time monitoring by obtaining the flow rate output at least once per second in the flow rate measurement by the build-down method. Also the present inventors conducted various tests to examine whether the real-time performance can be achieved by reducing the internal volume V of the build-down capacity BC as well as the pressure difference $\Delta P$ at the time of the flow rate measurement based on the idea, and to check precision of the flow rate monitoring and reproducibility of the precision.

First, three types of FCSs with rated flow rates of F20, F200, and F600 (SCCM) as the pressure-type flow rate control device FSC for the testing device of FIG. 5 were prepared and the internal volume V of the build-down capacity BC was set at two different values about 1.78 cc and about 9.91 cc. Here, the 9.91 cc of the build-down capacity BC was obtained by adjusting the length of the pipeline as well as the inner pipe diameter. Further, the available time for flow rate output (b) was targeted to be 0.5 sec (0.25 ms×2000 points) and a testing environment temperature was set at 23° C.±1° C.

Second, the pressure recovery characteristic (the pressure recovery time (a)) of when the flow rate measurement by the build-down method was conducted was measured with the pressure at the upstream side of the FCS set at 370 kPa abs, the pressure difference ΔP set at 20 kPa abs, and a flow rate $N_2$ set at 100 SCCM (set at the FCS side).

FIG. 7 shows result of the pressure recovery characteristic measurement, FIG. 8 is an enlarged view thereof, and FIG. 9 shows a pressure drop characteristic at that time. As clearly shown in FIGS. 7 and 8, it was confirmed that the refilling time (the pressure recovery time (a)) might be significantly shortened even with the flow rate $N_2$ of 100 SCCM by making the internal volume V of the build-down capacity BC as well as the pressure drop range ΔP smaller respectively to 1.78 cc and 20 kPa abs, and the output of the measured flow rate with intervals of within one second was achieved as shown In FIG. 9.

Additionally, it was found that opening and closing speed of the primary side opening and closing switching valve (upstream side valve) AV has a significant impact in making the pressure recovery time (a) shorter compared to the available time for flow rate output (b). Thus it has turned out that the piezoelectric driven metal diaphragm valve or the direct-mounting electromagnetic valve were preferable as the primary side opening and closing switching valve (upstream side valve) AV.

Furthermore, it was found that a relationship among the measured flow rate, the internal volume V of the build-down capacity BC, and the pressure drop time (b) was especially important since the shortening of the pressure recovering time (a) achieved by the decrease of the pressure drop range ΔP as well as the internal volume V of the build-down capacity BC brought the shortening of the pressure drop time (available time for flow rate output (b)).

TABLE 1

Gas flow rate and pressure drop time per cycle when the build-down capacity is 1.78 cc

| Flow rate (sccm) | Dropping time (s) |
|---|---|
| 5 | 4.22 |
| 10 | 2.11 |
| 50 | 0.42 |
| 100 | 0.21 |

Table 1 shows a relationship between the measured flow rate (SCCM) and the pressure drop time (sec) when the internal volume V of the build-down capacity BC was set at 1.78 cc and it is shown that when the internal volume V of the build-down capacity BC was 1.78 cc, achieving more than once of the flow rate output per second for realizing flow rate monitoring equivalent to real-time monitoring was difficult unless the flow rate was no higher than 50 SCCM.

Here, the pressure drop characteristic during the available time for flow rate output (b) was required to have a linearity for measurement error reduction and it became clear that the flow rate measurement was only possible in a range where the pressure drop rate was constant (i.e. the range where there is the linearity).

FIGS. 10 to 12 show results of tests examined the pressure drop characteristic when the measured flow rate was 100, 50, and 10 SCCM. It shows that the pressure drop characteristic lost the linearity right after the build-down in any cases. Here, the build-down capacity BC was 1.78 cc and the fluid was $N_2$ gas.

The non-linearity right after the build-down shown in FIGS. 10 to 12 is assumed to be due to fluctuation of an internal temperature of the gas caused by adiabatic expansion of the gas resulting from the pressure change. It became clear that, with the lower measured flow rate, the non-linearity tended to be larger and a time width available for the flow rate measurement was accordingly narrowed.

Next, in a case where the available time for flow rate output (b) was within one second, the flow rate measurement error caused by the non-linearity of the pressure drop characteristic curb was measured by determining the flow rate measurement error for five times every 0.25 seconds. In other words, the error between the calculated flow rate and the control flow rate was examined by calculating the flow rate every 0.25 seconds with the internal volume V of the build-down capacity BC set at 1.78 cc as well as at 9.91 cc, the pressure drop range ΔP set at 20 kPa abs, and the time length for the flow rate to become stable after the primary side opening and closing switching valve (upstream side valve) AV was closed set at one second.

FIGS. 13 and 14 show the result and it was found that the error was significantly reduced when 0.25 seconds or longer have passed after the closure of the primary side opening and closing switching valve (upstream side valve) AV in any cases. In other words, it was confirmed that the error was decreased as the pressure drop characteristic curb was getting closer to a straight line.

Table 2 shows a relationship among the internal volume V of the build-down capacity BC, the measured flow rate, and the pressure drop time (b), and indicates that when the internal volume V of the build-down capacity BC was 1.78 cc, the flow rate output with intervals of about within one second might be achieved at the flow rate of 20 to 50 SCCM. It also shows that in case the internal volume V of the build-down capacity BC was 9.91 cc, the flow rate output with intervals of about within one second might be achieved at the flow rate of 100 to 200 SCCM.

TABLE 2

| Pressure drop range Δ P = 20 kPa abs | | | |
|---|---|---|---|
| Build-down capacity BC: 1.78 cc | | Build-down capacity BC: 9.91 cc | |
| Flow rate (sccm) | Dropping time (s) | Flow rate (sccm) | Dropping time (s) |
| 5 | 4.22 | 50 | 2.35 |
| 10 | 2.11 | 100 | 1.17 |
| 20 | 1.05 | 200 | 0.59 |
| 50 | 0.42 | | |

FIG. 15 is a block diagram illustrating a basic configuration of a pressure-type flow rate control device provided with a flow rate monitor that the present inventors had previously developed based on the results of the tests and the pressure-type flow rate control device provided with the flow rate monitor includes a build-down section BDM, a pressure-type flow rate control section FCS, and a signal transmission circuit (digital communication circuit) CT that connects the build-down section BDM and the pressure-type flow rate control section FCS.

Here, in FIG. 15, a reference sign $PV_1$ designates an inlet side switching valve, a reference sign $PV_2$ designates an outlet side switching valve, a reference sign BC designates a build-down capacity, a reference sign $P_3$ designates a pressure sensor, a reference sign CPb designates a monitoring flow rate computing control section, a reference sign $VB_1$ designates an inlet side block of the monitor, and a reference sign $VB_2$ designates an outlet side block of the monitor.

Also in FIG. 15, a reference sign CV designates a control valve, a reference sign CPa designates a flow rate computing control section, a reference sign $OR_1$ designates a small diameter orifice, a reference sign $OR_2$ designates a large diameter orifice, a reference sign $P_1$ designates a first pressure sensor, a reference sign $P_2$ designates a second pressure sensor, a reference sign $VB_3$ designates an inlet side block of the flow rate control section, a reference sign $VB_4$ designates an outlet side block of the flow rate control section, a reference sign $VB_5$ designates a connecting block, and a reference sign SK designates a gasket of a connecting part.

The pressure-type flow rate control section FCS has a set flow rate adjusting mechanism QRS where a predetermined flow rate Qs is compared with a build-down flow rate Q that is inputted through the signal transmission circuit CT by a comparator (not shown) and then, in case a difference between the build-down flow rate Q and the predetermined flow rate Qs is larger than a specified value, the set flow rate Qs is automatically modified to Qs' so that a control flow rate of the pressure-type flow rate section FCS matches with the build-down flow rate Q. In other words, the actual flow rate is adjusted to be matched with the build-down flow rate Q. Here, in FIG. 15, a temperature detection sensor T, a filter F and such are not shown, and the pressure-type flow rate control section FCS may be any type, for example, a device with an only one orifice. Basic configurations of the pressure-type flow rate control section FCS and/or the build-down type flow rate monitoring section BDM will not be described here as they are publically known.

Specifically, gas with a pressure of 500 to 320 kPa abs that flows into the build-down type flow rate monitoring section BDM from a gas inlet 1 passes through the inlet side piezoelectric switching valve PV 1, the chamber-type build-down capacity BC, then the outlet side piezoelectronic switching valve $PV_2$, and the monitoring flow rate Q is calculated at the monitoring flow rate computing control section CPb and entered to the set flow rate adjusting mechanism QSR of the pressure-type flow rate control section FCS. The gas flowing out from the build-down type flow rate monitoring section BDM flows through the control valve CV, the small diameter orifice $OR_1$ and/or the large diameter orifice $OR_2$, then flows out from the gas outlet 2. During the course, the flow rate computing control section CPa calculates the flow rate of the gas flowing through the orifice and simultaneously conducts opening and closing control of the control valve CV as well as an orifice switching valve OLV.

Further, the monitoring flow rate Q from the build-down type flow rate monitoring section BDM and the flow rate of the gas flowing through the orifice (i.e. the control flow rate at the flow rate computing control section CPa) are compared with each other at the set flow rate adjusting mechanism QSR of the flow rate computing control section CPa, and in case the difference between them excesses the prescribed value, the set flow rate Qs is automatically modified to the Qs' so that the control flow rate of the pressure-type flow rate control section FCS matches with the monitoring flow rate Q.

In other words, the build-down type flow rate monitoring control section CPb that forms an essential part of the flow rate control device according to the present invention cal-culates the build-down flow rate Q using the opening and closing control of the inlet side (upstream side) piezoelectric switching valve $PV_1$, the pressure sensor $P_3$, the temperature detecting sensor T (not shown in FIG. 15), and the volume V of the build-down capacity BC between the both switching valves $PV_1$ and $PV_2$, then outputs the calculated flow rate Q to the flow rate computing control section CPa.

As described above, in the pressure-type flow rate control device provided with the flow rate monitor according to the present invention, measurement of a pressure drop rate $\Delta P/\Delta t$ and calculation of the monitoring flow rate Q are conducted in the build-down type flow rate monitoring section BDM, and the monitoring flow rate value is displayed on a monitor at least once per second and the control flow rate value of the pressure-type flow rate control section FCS is automatically amended and revised simultaneously by entering a command signal and/or a setting signal to the monitoring flow rate computing control section CPb via an external input/output circuit PIO.

Additionally, in case there is the difference no smaller than the prescribed value between the monitoring flow rate output Q (the flow rate output from the monitoring flow rate computing control section CPb) and the flow rate output from the pressure-type flow rate control section FCS (the flow rate output from the pressure-type flow rate computing control section CPa), an alarm of abnormal flow rate is generated or, when required, a cause and an occurrence location of the flow rate abnormality can be identified by a so-called flow rate self-diagnosis conducted by the pressure-type flow rate control device FCS. Furthermore, in case the flow rate difference that is larger than the prescribed value occurs, it is possible to automatically conduct zero point adjustment or the like of the pressure-type flow rate control section FCS.

In the device of FIG. 15, the inlet side switching valves and such are piezoelectric driven valves but the valves may be linear motion electromagnetic driven valves. Further, the internal volume V of the build-down capacity BC is set to fall between 1.78 cc and 9.91 cc and in addition, the pressure drop range $\Delta P$ is set to be 20 kPa abs (350 to 320 kPa abs), and the monitoring flow rate is outputted no less than once per second. In addition, the temperature detecting sensor T (not shown) is an outer face mounting resistance thermometer type temperature sensor though, a thermostat type thermometer that to be inserted into the monitor block $VB_1$ or $VB_2$ may be used.

Furthermore, in FIG. 15, a chamber with a pressure sensor is used as the build-down capacity BC as described later though, the build-down capacity BC may be configured to have the internal volume V of a preferred volume by being formed as an internal volume of a gas flow passage with a properly selected inner diameter as well as a length.

FIG. 16 is a schematic longitudinal sectional view of the pressure-type flow rate control device provided with the build-down type flow rate monitor shown in FIG. 15. In this embodiment, the chamber CH with the pressure sensor is used as the build-down capacity BC, and an inner diameter of each gas passage $L_1$, $L_3$, and $L_5$ of the build-down type flow rate monitoring section BDM is configured to be a small diameter of 1.8 mm. In addition, the second pressure sensor $P_2$ is separately provided to a downstream side of the orifices $OR_1$ and $OR_2$. Further, the pressure sensor $P_3$ is provided to the chamber CH.

In other words, in FIG. 16, the small-sized pressure chamber CH is provided between the inlet side switching valve $PV_1$ and the outlet side switching valve $PV_2$, and the internal volume V of the build-down capacity BC can be adjusted by controlling the internal volume of the pressure chamber CH. Here, a piezoelectric driven metal diaphragm type normally closed valve is used for faster opening and closing as the each switching valve $PV_1$ and $PV_2$. The piezoelectric driven metal diaphragm type normally closed valve which is well known will not be described here.

The pressure chamber CH is formed of double cylinder including an outer cylinder CHa and an inner cylinder CHb, and in this embodiment, a gap G between the outer and inner cylinders CHa and CHb is configured to be 1.8 mm. The pressure chamber CH is configured to have the internal volume of about 1.3 to 12 cc and the pressure sensor $P_3$ is attached thereto.

Here in the device shown in FIG. 16, the volume of the pressure chamber CH may be selected freely, and the gas flow passages including $L_1$, $L_2$, and $L_4$ may be configured to have the same small diameter (for example, 1.8 mm) for correctly and easily setting the internal volume of the build-down capacity BC to a predetermined value of the volume.

Specifically, five types of chambers as shown in Table 3 were prepared with the gap G of 1.8 mm or 3.6 mm as the chamber CH for testing and those were used in the testing device shown in FIG. 5 for investigating a relationship among the gas flow rate (SCCM), the pressure drop rate (kPa/sec), and the pressure drop time (sec).

Here, in the test using the testing device shown in FIG. 5, the flow rate sensor T was mounted to the outer face of the chamber CH. A volume of the each gas flow passage $L_3$ and $L_5$ except the part of the chamber CH was 0.226 cc.

TABLE 3

| Chamber A | |
| --- | --- |
| Gap | 1.8 Mm |
| Height | 14.0 Mm |
| Diameter | 18.0 Mm |
| Chamber | 1.58 Cc |
| Volume of other paths | 0.226 Cc |
| Actual total volume | 2.31 Cc |
| Chamber B | |
| Gap | 1.8 mm |
| Height | 92.0 mm |
| Diameter | 18.0 mm |
| Chamber | 8.72 cc |
| Volume of other paths | 0.226 cc |
| Actual total volume | 9.70 cc |
| Chamber C | |
| Gap | 2.4 mm |
| Height | 92.0 mm |
| Diameter | 18.0 mm |
| Chamber | 11.15 cc |
| Volume of other paths | 0.226 cc |
| Actual total volume | 11.55 cc |
| Chamber D | |
| Gap | 3.0 Mm |
| Height | 92.0 Mm |
| Diameter | 18.0 Mm |
| Chamber | 13.35 Cc |
| Volume of other paths | 0.226 Cc |
| Actual total volume | 13.91 Cc |
| Chamber E | |
| Gap | 3.6 mm |
| Height | 92.0 mm |
| Diameter | 18.0 mm |
| Chamber | 15.31 cc |
| Volume of other paths | 0.226 cc |
| Actual total volume | 15.45 cc |

FIG. 17 shows measurement result of the relationship between the gas flow rate (SCCM) and the pressure drop rate (kPa/sec) in each case of chamber A to E when the pressure drop time (b) shown in FIG. 6 was within one second, and the actual build-down capacity of the each chamber set in the testing device was 2.31 cc to 15.45 cc.

As clearly shown in FIG. 17, in case the pressure drop range ΔP was 20 kPa/sec, flow rate measurement was possible at 25.2 sccm in the chamber A, at 106.6 sccm in the chamber B, and at 169.0 sccm in the chamber E.

The pressure-type flow rate control device provided with the flow rate monitor shown in FIG. 15 as well as FIG. 16 includes the build-down type flow rate monitoring section BDM provided to the upstream side, the pressure-type flow rate control section FCS provided to the downstream side, the signal transmission circuit CT that connects the build-down type flow rate monitoring section BDM and the pressure-type flow rate control section FCS to transmit the signal of the monitoring flow rate Q by the build-down type flow rate monitoring section BDM to the pressure-type flow rate control section FCS, and the set flow rate adjusting mechanism QSR provided to the pressure-type flow rate control section FCS that adjusts the set flow rate Qs of the pressure-type flow rate control section FCS based on the monitoring flow rate Q from the build-down type flow rate monitoring section BDM for automatically adjusting the set flow rate of the pressure-type flow rate control section FCS based on the monitoring flow rate of the build-down type flow rate monitoring section BDM.

As a result, the situation where there is a significant difference between the monitoring flow rate (the actual flow rate value of the gas passing through the orifices) and the predetermined flow rate of the pressure-type flow rate control section FCS (the control flow rate value) that lasts long is eliminated and many benefits such as quality improvement in semiconductor products are achieved.

In addition, a pressure drop value (pressure difference ΔP), a pressure drop time (Δt), and an internal volume V of the build-down capacity BC are set so that the monitoring flow rate can be calculated and outputted no less than once per second based on the pressure drop rate ΔP/Δt, the internal volume V of the build-down capacity BC, and a gas temperature K by generating the pressure drop ΔP which corresponds to a gas pressure difference within an allowed pressure fluctuation range for an input-side of the pressure-type flow rate control section FCS in the build-down capacity BC using high responsiveness to the pressure fluctuation at the input side of the flow rate control section with the build-down type flow rate monitoring section BDM provided at the upstream side of the pressure-type flow rate control section FCS.

As a result, it becomes possible to highly precisely calculate and output the monitoring flow rate no less than once per second by setting the pressure drop value (pressure difference) ΔP to about 20 to 30 kPa abs, the pressure drop time Δt to 0.5 to 0.8 seconds, and the internal volume V of the build-down capacity BC to 1.8 to 18 cc, and highly precise flow rate monitoring in almost real time accordingly becomes possible even the build-down system is used.

In addition, comparing to the conventional system with the thermal-type flow rate sensor combined, significant structure simplification, downsizing, and production cost reduction become possible in the pressure-type flow rate control device provided with the flow rate monitor, and an added value of the flow rate control device provided with the flow rate monitor may be improved a lot.

However, there are a lot of problems left unsolved in the pressure type flow rate control device provided with the flow rate monitor shown in FIGS. 15 and 16.

Especially in case the control flow rate dramatically changes, for precisely calculating and outputting the monitoring flow rate no less than once per second with the pressure drop value (pressure difference) ΔP set at about 20 to 30 kPa abs and the pressure drop time Δt set at 0.5 to 0.8 sec, it is required to quickly and accurately adjust the internal volume V of the build-down capacity BC to a proper value. As a result, there are problems caused such as increase in size and production cost of the pressure type flow rate control device provided with the flow rate monitor due to considerable complication of the build-down capacity adjustment mechanism.

CITATION LIST

Patent Literature

Patent Document 1: Japanese Patent No. 2635929
Patent Document 2: Japanese Patent No. 2982003
Patent Document 3: Japanese Patent No. 4308356
Patent Document 4: Japanese Patent No. 4137666
Patent Document 5: Japanese Laid-Open Patent Publication No. 2003-195948

SUMMARY OF INVENTION

Technical Problem

An object of the present invention is to solve problems such as follows: (a) in case of a flow rate control device provided with a flow rate monitor using a conventional build-up type or build-down type flow rate measurement method, temporally stop of gas supply for monitoring flow rate causes lower operation rate of semiconductor manufacturing equipment and variation in quality of manufactured semiconductors, (b) in case of a conventional flow rate control device provided with a flow rate monitor shown in FIG. 21 that has an assembly structure of a thermal-type flow meter and a pressure-type flow rate control device, a set value for control flow rate cannot be automatically corrected even an abnormality is found in an actual flow rate and a resulting delay in flow rate correction causes various issues, and in addition, simplification as well as downsizing of a structure of the flow rate control device is difficult, and also a superior response characteristic as well as a stable flow rate control characteristic of the pressure-type flow rate control device are deteriorated, and (c) in case the control flow rate dramatically fluctuates, a complicated build-down capacity adjustment mechanism is required for adjusting the build-down capacity to a proper value, and the capacity adjustment takes much trouble. The another object of the present invention is to provide a flow rate control device provided with a flow rate range switching type flow rate monitor that includes a pressure-type flow rate control device FCS and a build-down type flow rate measuring section provided to an upstream side of the pressure-type flow rate control device FCS that are integrally combined, and easily and precisely conducts flow rate monitoring for a larger flow rate range as well as a smaller flow rate range by operating the build-down type flow rate measuring section within an allowed pressure fluctuation range for the upstream side pressure (input side pressure) of the flow rate control device and easily switching the build-down capacity to a capacity for the larger flow rate and to a capacity for the smaller flow rate by valve operation, and furthermore, in case a difference between a monitoring flow rate value and a control flow rate value excess a prescribed value, the flow rate control device automatically adjusts the predetermined flow rate value at the pressure-type flow rate control device to correct the control flow rate value set at the pressure-type flow rate control device to the flow rate measured by the build-down type flow rate measuring section.

In other words, the present invention is to provide the flow rate range switching type build-down flow meter and the flow rate control device provided with the flow rate range switching type flow rate monitor that can conduct flow rate monitoring with the build-down type flow monitoring section almost in real time (at least once per second) and further can simplify a computing control section, expand a flow rate control range, significantly downsize a device body, and improve gas replacement characteristic by making the most of a flow rate characteristic of the pressure-type flow rate control device that the flow rate control characteristic is not almost affected by the fluctuation of the input side pressure.

Solution to Problem

To solve the above described problems, a flow meter according to the present invention has been developed based on results of tests previously described, and a build-down type flow meter of the present invention according to claim 1 is basically configured to include an inlet side opening and closing switching valve $PV_1$ provided on a flow passage, an outlet side opening and closing switching valve $PV_2$ provided to a downstream side of the inlet side opening and closing switching valve $PV_1$, and a control valve CV provided to a downstream side of the outlet side opening and closing switching valve $PV_2$ that are connected with each other by flow passages having internal volumes, a pressure sensor $P_3$ provided to an upstream side of the control valve CV, a larger flow rate measuring section for calculating a flow rate based on a build-down volume $V_1$ which is an internal volume of the flow passage between an outlet side of the inlet side opening and closing switching valve $PV_1$ and an inlet side of the control valve CV, and a smaller flow rate measuring section for calculating a flow rate based on a build-down volume $V_2$ which is an internal volume of the flow passage between an outlet side of the outlet side opening and closing switching valve $PV_2$ and the inlet side of the control valve CV.

Here, the control valve CV may be a control valve CV inside of a flow rate control section FCS.

In addition, the plurality of flow passages having the inner volumes which are separated by the opening and closing switching valves are provided.

In a first embodiment of a flow rate control device according to the present invention, the flow rate control device is basically configured to include a build-down type flow rate monitoring section BDM provided to an upstream side and a flow rate control section FCS provided to a downstream side of the build-down type flow rate monitoring section, and the build-down type flow rate monitoring section BDM includes an inlet side opening and closing switching valve $PV_1$, a build-down capacity BC provided to a downstream side of the inlet side opening and closing switching valve, a temperature sensor Th provided to a gas passage of a downstream side of the build-down capacity BC, an outlet side opening and closing switching valve $PV_2$ provided to the downstream side of the build-down capacity BC, a pressure sensor $P_3$ provided to a downstream side of the outlet side opening and closing switching valve, and a monitoring flow rate computing control section CPb to which detected values by the temperature sensor Th as well as the pressure sensor $P_3$ are inputted where a monitoring flow rate $Q_1$ for a larger flow rate range is calculated based on a build-down volume V which is an inner volume of a gas passage between the outlet side of the inlet side opening and closing switching valve $PV_1$ and a control valve CV of the flow rate control section FCS and a monitoring flow rate $Q_2$ for a smaller flow rate range is calculated based on the build-down volume V which is an inner volume of a gas passage between the outlet side of the outlet side opening and closing switching valve $PV_2$ and the control valve CV of the flow rate control section FCS.

In the first embodiment of the flow rate control device according to the present invention, the build-down type flow rate monitoring section BDM and the flow rate control section FCS may be connected by a signal transmission circuit CT for transmitting a signal of a monitoring flow rate Q of the build-down type flow rate monitoring section BDM to the flow rate control section FCS, and a set flow rate adjusting mechanism QSR that adjusts a predetermined flow rate Qs of the flow rate control section FCS based on the monitoring flow rate Q from the build-down type flow rate monitoring section BDM may be provided.

In a second embodiment of the flow rate control device according to the present invention, a flow rate control device is basically configured to include a build-down type flow rate monitoring section BDM provided to an upstream side, a flow rate control section FCS provided to a downstream side of the build-down type flow rate monitoring section, a signal transmission circuit CT for connecting the build-down type flow rate monitoring section BDM and the flow rate control section FCS to transmit a signal of a monitoring flow rate Q by the build-down type flow rate monitoring section BDM to the flow rate control section FCS, and a set flow rate adjusting mechanism QSR provided to the flow rate control section FCS that adjusts a set flow rate Qs of the flow rate control section FCS based on the monitoring flow rate Q of the build-down type flow rate monitoring section BDM, and the build-down type flow rate monitoring section BDM includes an inlet side opening and closing switching valve $PV_1$ for releasing and stopping gas supply from a gas source, a build-down capacity BC with a predetermined internal volume connected to an outlet side of the inlet side opening and closing switching valve $PV_1$, an outlet side opening and closing switching valve $PV_2$ connected to the outlet side of the build-down capacity BC, a pressure sensor $P_3$ for detecting a pressure of gas flowing through a passage at a downstream side of the outlet side opening and closing switching valve $PV_2$, a temperature sensor for detecting a temperature of the gas flowing through the passage at the downstream side of the outlet side opening and closing switching valve $PV_2$, and a monitoring flow rate computing control section CPb that calculates and outputs a flow rate $Q_1$ for a larger flow rate range by using the build-down method in case of the larger flow rate by opening the inlet side opening and closing switching valve $PV_1$ to increase the gas pressure in the build-down volume V to a set pressure upper limit value then closing the inlet side opening and closing switching valve $PV_1$ to decrease the gas pressure to a set pressure lower limit value after a predetermined time t seconds with the outlet side opening and closing switching valve $PV_2$ kept opened and the inlet side opening and closing switching valve $P_1$ operated to be opened and closed where the build-down volume V is an internal volume of a gas passage between the outlet side of the inlet side opening and closing switching valve $PV_1$ and the control valve CV of the flow rate control section FCS, and that also calculates and outputs a monitoring flow rate $Q_2$ for a smaller flow rate range by using the build-down method in case of the smaller flow rate by opening the outlet side opening and closing switching valve $PV_2$ to increase the gas pressure in the build-down capacity V to a set pressure upper limit value then closing the outlet side opening and closing switching valve $PV_2$ to decrease the gas pressure to a set pressure lower limit value after a predetermined time t seconds with the inlet side opening and closing switching valve $PV_1$ kept opened and the outlet side opening and closing switching valve $P_2$ operated to be opened and closed where the build-down volume V is an internal volume of a gas passage between the outlet side of the outlet side opening and closing switching valve $PV_2$ and the control valve CV of the flow rate control section FCS, and here, the monitoring flow rate Q is calculated by a following formula (2).

$$Q = \frac{1000}{760} \times 60 \times \frac{273}{(273+T)} \times V \times \frac{\Delta p}{\Delta t} \quad \text{[Formula 2]}$$

(Provided that, T represents a gas temperature (° C.), V represents the build-down volume (1), $\Delta P$ represents a pressure drop range (set pressure upper limit value–set pressure lower limit value) (Torr), and $\Delta t$ represents the time (sec) between the close and open of the inlet side opening and closing switching valve AV.

In the second embodiment of the flow rate control device according to the present invention, the set flow rate adjusting mechanism GSR may be a set flow rate adjusting mechanism including a comparator for comparing the monitoring flow rate Q and the set flow rate Qs that automatically adjusts the set flow rate Qs to the monitoring flow rate Q in case a difference between the monitoring flow rate Q and the set flow rate Qs excesses a prescribed value.

In the second embodiment of the flow rate control device according to the present invention, the flow rate control section FCS may be a pressure fluctuation proof pressure-type flow rate control device FCS including the control valve CV, an orifice OR or a critical nozzle, a pressure meter $P_1$ and/or a pressure meter $P_2$, and a flow rate computing control section CPa.

In the second embodiment of the flow rate control device according to the present invention, the build-down volume V may be configured to be 0.5 to 20 cc, the set pressure upper limit value may be configured to be 400 to 100 kPa abs, the set pressure lower limit value may be configured to be 350 to 50 kPa abs, and the predetermined time t may be configured to be 0.5 to 5 seconds.

In the second embodiment of the flow rate control device according to the present invention, the internal volume V of the gas passage between the outlet side of the inlet side opening and closing switching valve $PV_1$ and the control valve CV of the flow rate control section FCS may be configured to be 13 to 15 cc, a monitoring flow rate range for the larger flow rate may be configured to be 40 to 600 SCCM, and a monitoring flow rate range for the smaller flow rate may be configured to be 1 to 50 SCCM.

In the second embodiment of the flow rate control device according to the present invention, the recovery time for the gas pressure to recover from the set pressure lower limit to the set pressure upper limit by opening the inlet side opening and closing switching valve $PV_1$ may be configured to be significantly shorter than the drop time for the gas pressure to drop from the set pressure upper limit to the set pressure lower limit by closing the inlet side opening and closing switching valve AV by making the inlet side opening and closing switching valve $PV_1$ a piezoelectric driven metal diaphragm valve or a linear motion electromagnetic valve as well as by opening and closing the valves at a high speed.

In the second embodiment of the flow rate control device according to the present invention, the flow rate computing control device CPa of the flow rate control section FCS and the monitoring flow rate computing control device CPb of the build-down type flow rate monitoring section BDW may be integrally formed.

In the second embodiment of the flow rate control device according to the present invention, the build-down capacity BC may be a chamber with a structure having an inner cylinder and an outer cylinder that are concentrically fixed, and a gap between the inner cylinder and the outer cylinder that form the chamber may be a gas passage.

In the second embodiment of the flow rate control device according to the present invention, the build-down capacity BC may be a plurality of chambers each of which has a structure having the inner cylinder and the outer cylinder that are concentrically fixed arranged in parallel, and a gap between the each inner and the outer cylinder may be the gas passage, then the gas passages of the chambers may be connected in parallel.

Advantageous Effects of Invention

A flow meter of the present invention is configured to have a larger flow rate measuring section that calculates a flow rate based on a build-down volume $V_1$ which is an internal volume of a flow passage between an outlet side of an inlet side opening and closing switching valve $PV_1$ and an inlet side of a control valve CV and a smaller flow rate measuring section that calculates a flow rate based on a build-down volume $V_2$ which is an internal volume of a flow passage between an outlet side of an outlet side opening and closing switching valve $PV_2$ and the inlet side of the control valve CV. This makes it possible for the flow meter to measure a wide range of gas flow rates by itself.

A flow rate control device of the present invention is configured to have a build-down type flow rate monitoring section BDM provided to an upstream side, a flow rate control section FCS provided to a downstream side of the build-down type flow rate monitoring section, a signal transmission circuit CT that connects the build-down type flow rate monitoring section BDM and the flow rate control section FCS to transmit a signal of a monitoring flow rate Q by the build-down type flow rate monitoring section BDM to the flow rate control section FCS, and a predetermined flow rate adjusting mechanism QSR provided to the flow rate control section FCS that adjusts a predetermined flow rate Qs of the flow rate control section FCS based on the monitoring flow rate Q from the build-down type flow rate monitoring section BDM for automatically adjusting the predetermined flow rate of the flow rate control section FCS based on the monitoring flow rate of the build-down type flow rate monitoring section BDM.

As a result, the situation where there is a significant difference between the monitoring flow rate (the actual flow rate value of the gas passing through the orifices) and the predetermined flow rate of the flow rate control section FCS (the control flow rate value) lasts long can be eliminated and many benefits such as quality improvement in semiconductor products can be achieved.

In addition, a pressure drop value (pressure difference $\Delta P$), a pressure drop time ($\Delta t$), and an internal volume V of the build-down capacity BC are set so that the monitoring flow rate can be calculated and outputted no less than once per a second based on the pressure drop rate $\Delta P/\Delta t$, the internal volume V of the build-down capacity BC, and a gas temperature K by generating the pressure drop $\Delta P$ which corresponds to a gas pressure difference within an allowed pressure fluctuation range for an input-side of the pressure-type flow rate control section FCS in the build-down capacity BC using high responsiveness to the pressure fluctuation at the input side of the flow rate control section with the build-down type flow rate monitoring section BDM provided at the upstream side of the pressure-type flow rate control section FCS.

As a result, it becomes possible to highly precisely calculate and output the monitoring flow rate no less than once per second by properly setting the pressure drop value (pressure difference) $\Delta P$, the pressure drop time $\Delta t$, and the build-down capacity V to achieve highly precise flow rate monitoring in almost real time even the build-down system is used.

Furthermore, the build-down type flow rate monitoring section BDM is configured to include the inlet side opening and closing switching valve $PV_1$ for releasing and stopping gas supply from a gas source, the build-down capacity BC with the predetermined internal volume V connected to the outlet side of the inlet side opening and closing switching valve $PV_1$, the outlet side opening and closing switching valve $PV_2$ connected to an outlet side of the build-down capacity BC, a pressure sensor $P_3$ for detecting a pressure of gas flowing through a passage at a downstream side of the outlet side opening and closing switching valve $PV_2$, a temperature sensor for detecting a temperature of the gas flowing through the passage at the downstream side of the outlet side opening and closing switching valve $PV_2$, and a monitoring flow rate computing control section CPb that calculates and outputs a monitoring flow rate $Q_1$ for a larger flow rate range by using the build-down method in case of the larger flow rate by opening the inlet side opening and closing switching valve $PV_1$ to increase the gas pressure in the build-down capacity to a set pressure upper limit value then closing the inlet side opening and closing switching valve $PV_1$ to decrease the gas pressure to a set pressure lower limit value after a predetermined time t seconds with the outlet side opening and closing switching valve $PV_2$ kept opened and the inlet side opening and closing switching valve $P_1$ operated to be opened and closed where the build-down volume is an internal volume of a gas passage between the outlet side of the inlet side opening and closing switching valve $PV_1$ and the control valve CV of the flow rate control section FCS, and that also calculates and outputs a monitoring flow rate $Q_2$ for a smaller flow rate range by using the build-down method in case of the smaller flow rate by opening the outlet side opening and closing switching valve $PV_2$ to increase the gas pressure in the build-down capacity to a set pressure upper limit value then closing the outlet side opening and closing switching valve $PV_2$ to decrease the gas pressure to a set pressure lower limit value after a predetermined time t seconds with the inlet side opening and closing switching valve $PV_1$ kept opened and the outlet side opening and closing switching valve $P_2$ operated to be opened and closed where the build-down capacity is an internal volume of a gas passage between the outlet side of the outlet side opening and closing switching valve $PV_2$ and the control valve CV of the flow rate control section FCS.

As a result, precise flow rate monitoring almost in real time for both of the larger and smaller flow rate ranges becomes possible by properly selecting the internal volumes of the gas passages between the inlet side opening and closing switching valve $PV_1$ and the control valve CV of the flow rate control section FCS as well as between the outlet side opening and closing switching valve $PV_2$ and the control valve CV of the flow rate control section FCS, and by the properly conducting opening and closing operation of the inlet side opening and closing switching valve $PV_1$ as well as the outlet side opening and closing switching valve $PV_2$.

Furthermore, comparing to the conventional system with a thermal-type flow rate sensor combined, significant structure simplification, downsizing, and production cost reduction of the flow rate control device provided with the flow rate monitor become possible, and an added value of the flow rate control device provided with the flow rate monitor may be improved a lot.

DESCRIPTION OF EMBODIMENTS

Hereinafter, embodiments of the present invention are described with reference to the drawings.

Figure 1:
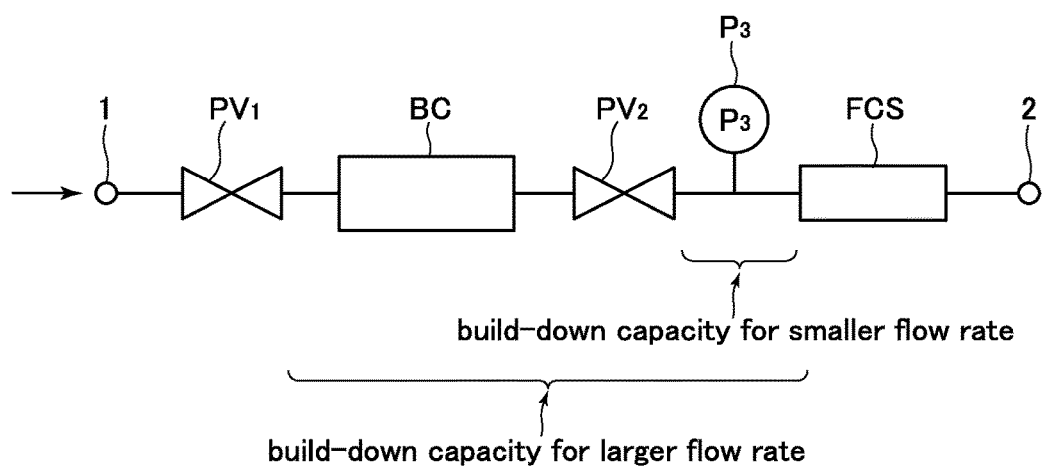
FIG. 1 A block diagram showing a basic concept of the present invention.
Figure 2:
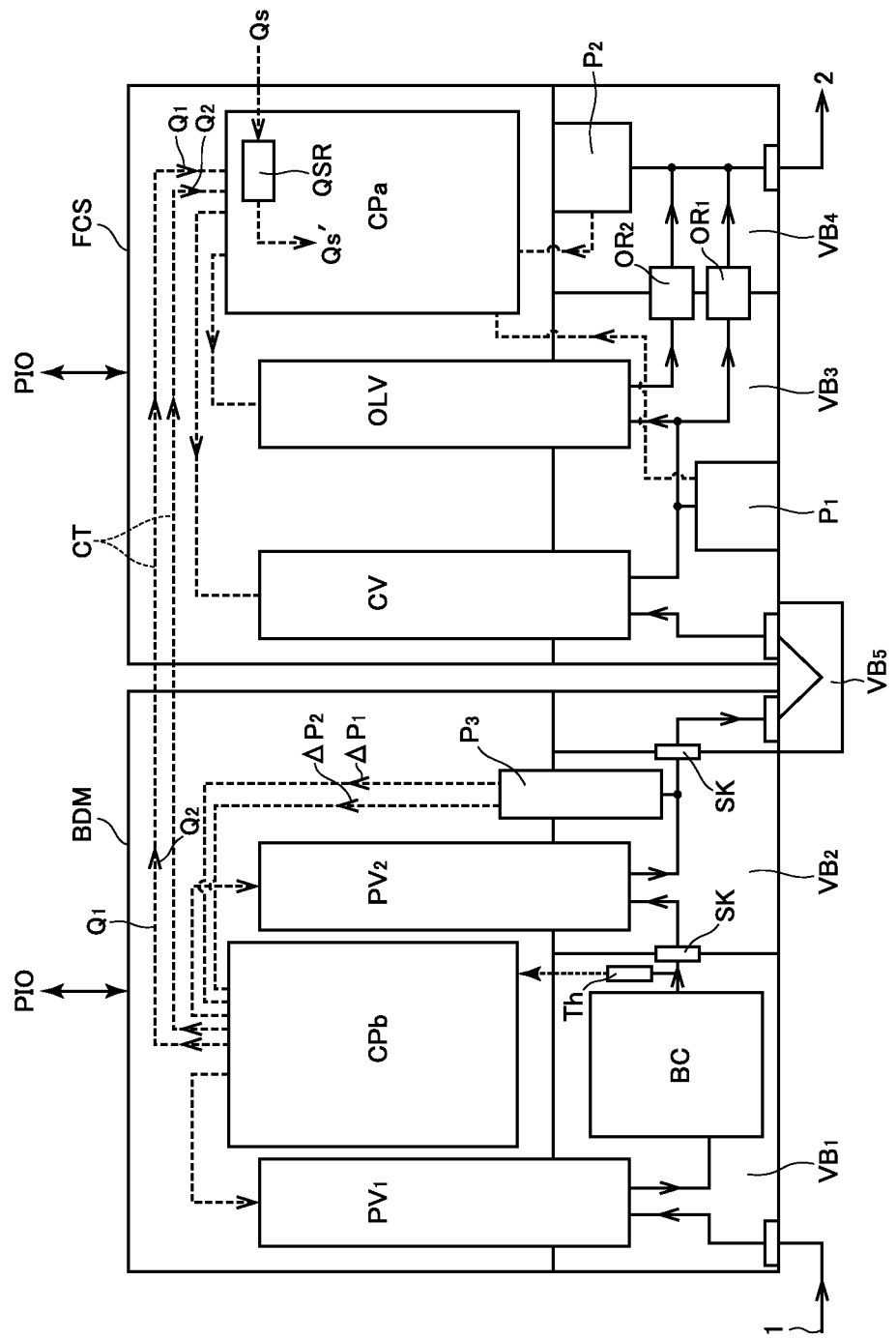
FIG. 2 A system diagram of a basic configuration of a flow rate control device provided with a flow rate range switching type flow rate monitor according to the present invention.
Figure 3:
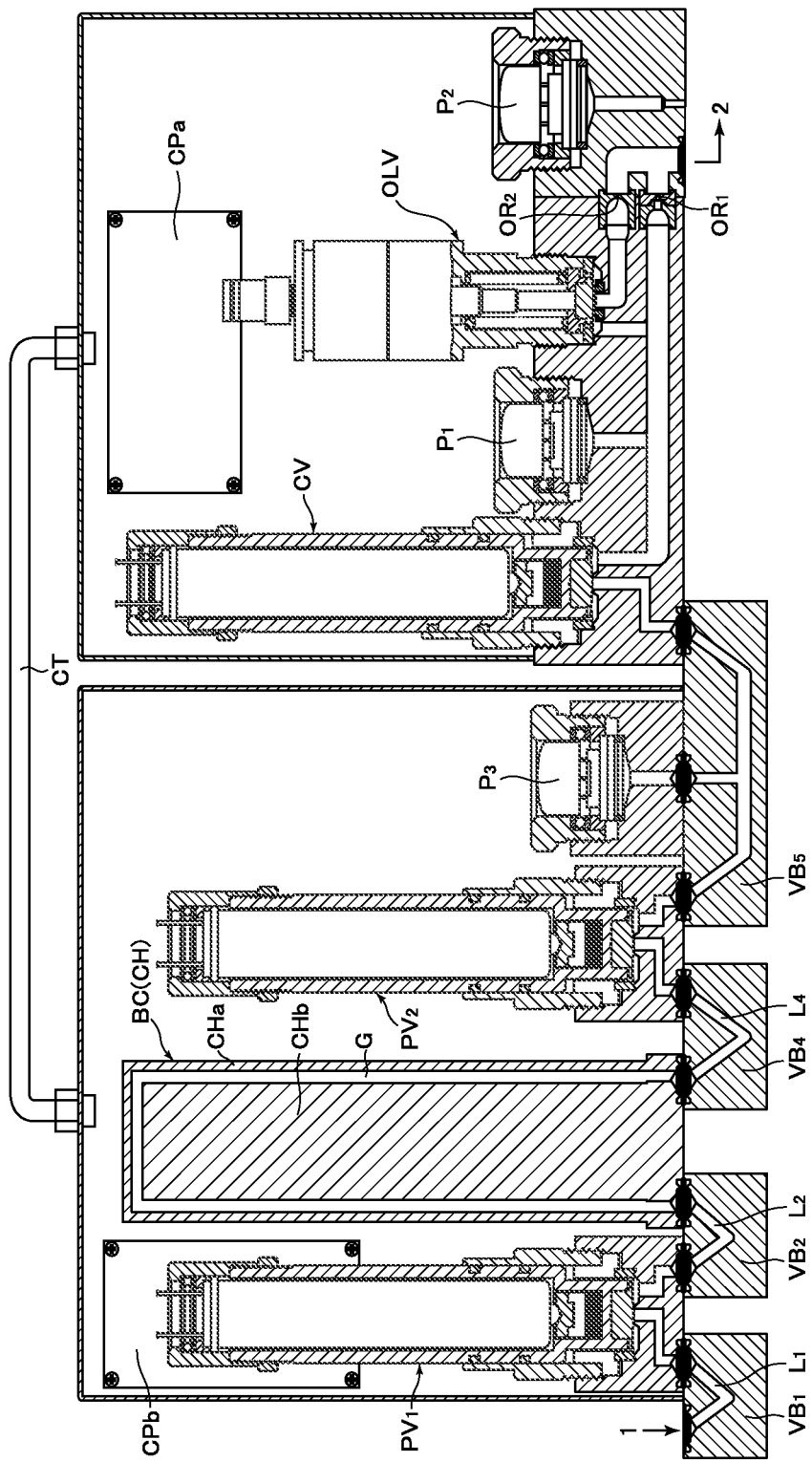
FIG. 3 A schematic longitudinal sectional view of the flow rate control device provided with the build-down type flow rate range switching flow rate monitor according to the present invention.

FIG. 1 is a block diagram showing a basic concept of the present invention, FIG. 2 is a system diagram of a basic configuration of a flow rate control device provided with a flow rate range switching type flow rate monitor according to the present invention, and FIG. 3 is a schematic longitudinal sectional view of the flow rate control device provided with the flow rate range switching type flow rate monitor according to the present invention.

The device according to the present invention is configured to be properly switched for monitoring and controlling a flow rate of gas of a larger flow rate range and for monitoring and controlling a flow rate of gas of a smaller flow rate range, and the pressure-type flow rate control device provided with the flow rate monitor includes a build-down section BDM, a pressure-type flow rate control section FCS, and a signal transmission circuit (digital communication circuit) CT connecting the build-down section and the flow rate control section.

Here, in FIGS. 1 to 3, a reference sign 1 designates a gas inlet, a reference sign 2 designates a gas outlet, a reference sign $PV_1$ designates an inlet side switching valve, a reference sign $PV_2$ designates an outlet side switching valve, a reference sign BC designates a build-down capacity, a reference sign $P_3$ designates a pressure sensor, a reference sign $\Delta P_1$ designates a pressure detection value in case of the monitoring for the larger flow rate range, a reference sign $\Delta P_2$ designates a pressure detection value in case of the monitoring for the smaller flow rate range, a reference sign $Q_1$ designates a monitoring flow rate detection value of the gas of the larger flow rate range, a reference sign $Q_2$ designates a monitoring flow rate detection value of the gas of the smaller flow rate range, a reference sign CPb designates a monitoring flow rate computing control section, a reference sign $VB_1$ designates an inlet side block of the monitor, and a reference sign $VB_2$ designates an outlet side block of the monitor.

In addition, in FIGS. 1 to 3, a reference sign CV designates a control valve, a reference sign CPa designates a flow rate computing control section, a reference sign $OR_1$ designates a small diameter orifice, a reference signal $OR_2$ designates a large diameter orifice, a reference sign $P_1$ designates a first pressure sensor, a reference sign $P_2$ designates a second pressure sensor, a reference sign $VB_3$ designates an inlet side block of the flow rate control section, a reference sign $VB_4$ designates an outlet side block of the flow rate control section, a reference sign $VB_5$ designates a connecting block, and a reference sign SK designates a connecting gasket.

Further, a set flow rate adjusting mechanism QSR is provided to the pressure-type flow rate control section FCS, and a set flow rate value Qs is compared to the build-down flow rate $Q_1$ or $Q_2$ that is inputted through the signal transmission circuit CT by a comparator (not shown) and when a difference between the set flow rate value Qs and the build-down flow rate becomes larger than a prescribed value, the set flow rate Qs is automatically amended to Qs' to match the control flow rate value of the pressure-type flow rate control section FCS with the build-down flow rate $Q_1$ or $Q_2$. In other words, the actual flow rate is adjusted to match with the build-down flow rate $Q_1$ or $Q_2$.

Figure 15:
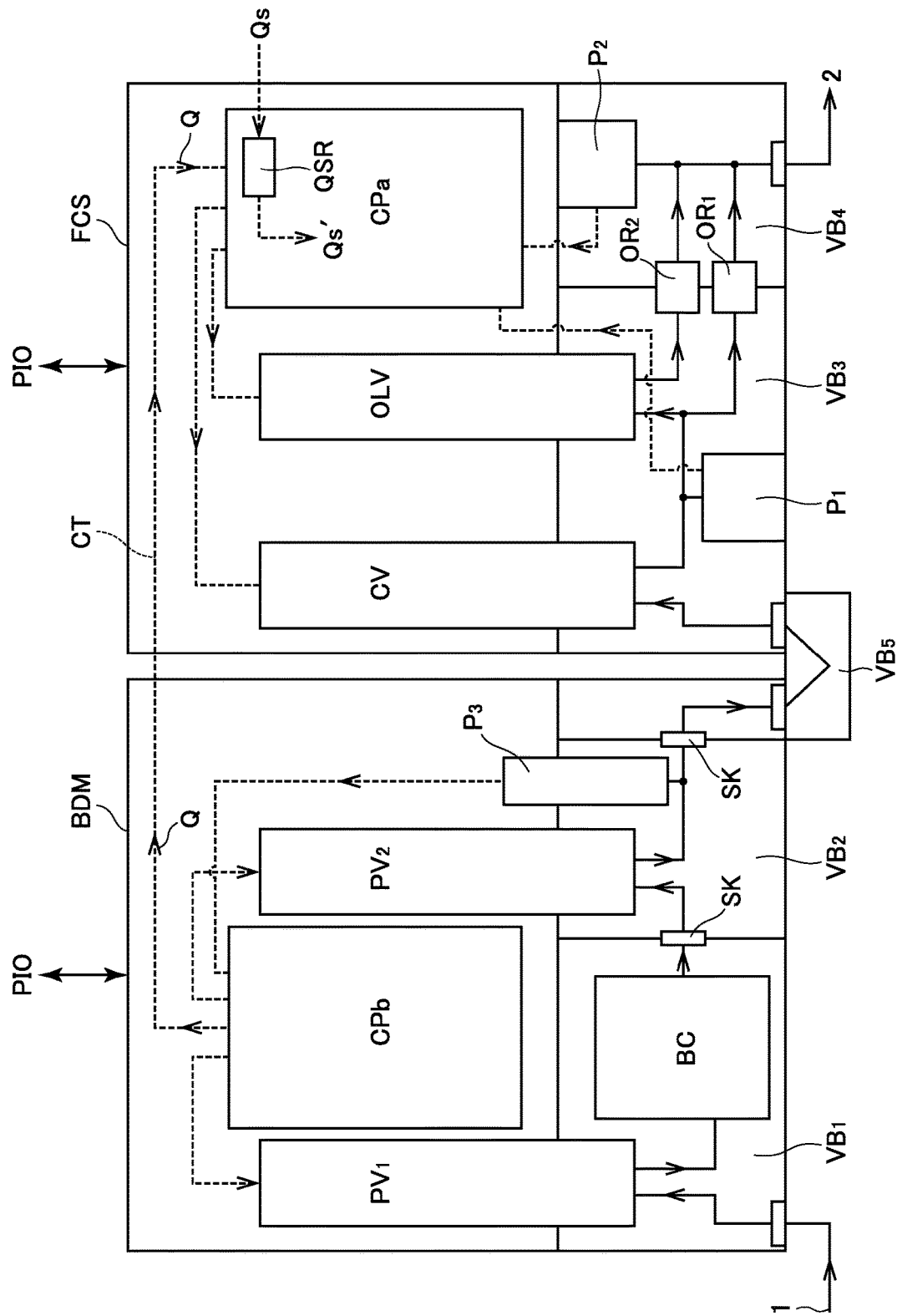
FIG. 15 A schematic diagram of a basic configuration of a flow rate control device provided with a flow rate monitor previously developed.
Figure 16:
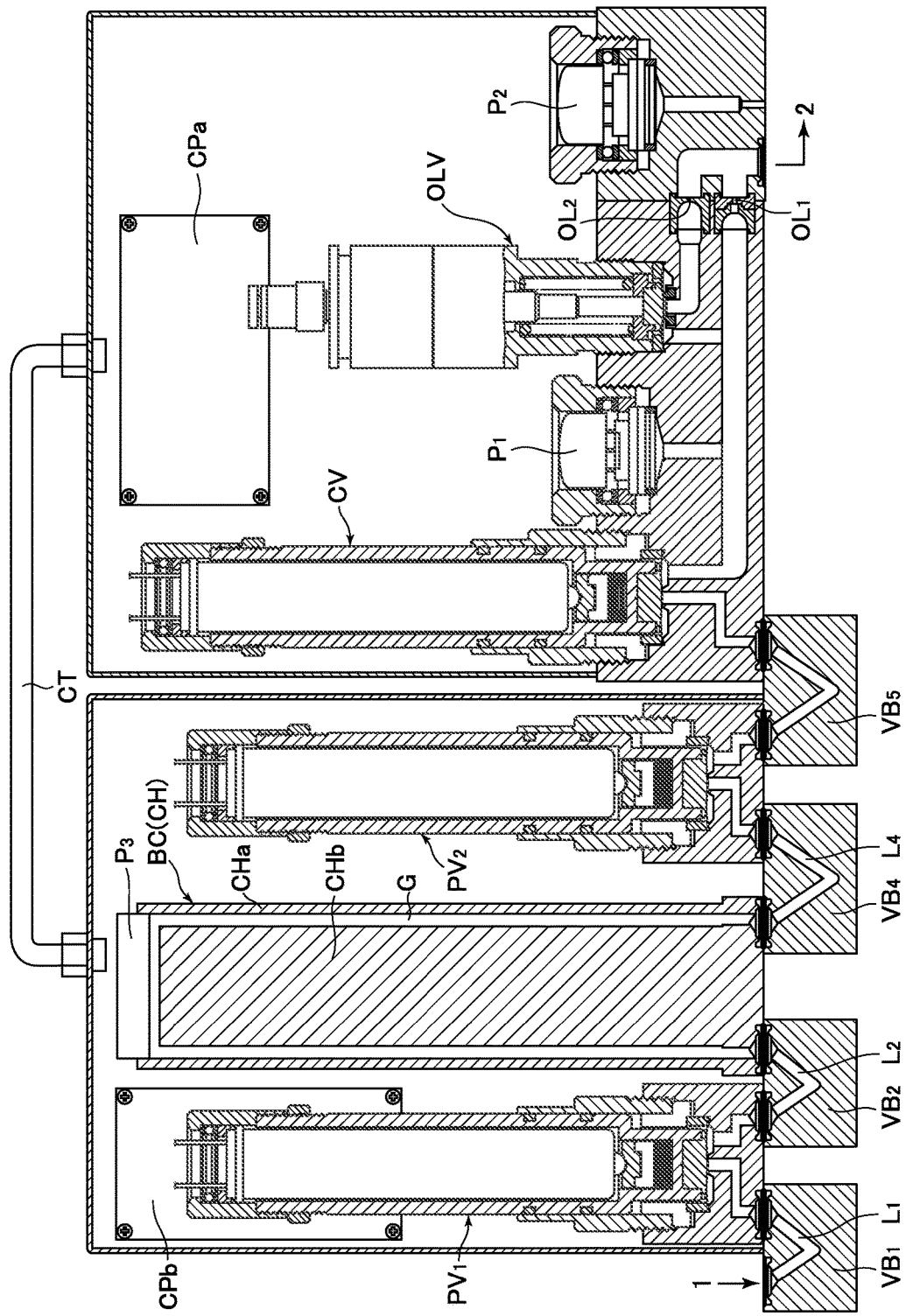
FIG. 16 A schematic longitudinal sectional view of the flow rate control device provided with the build-down type flow rate monitor previously developed.
Figure 17:
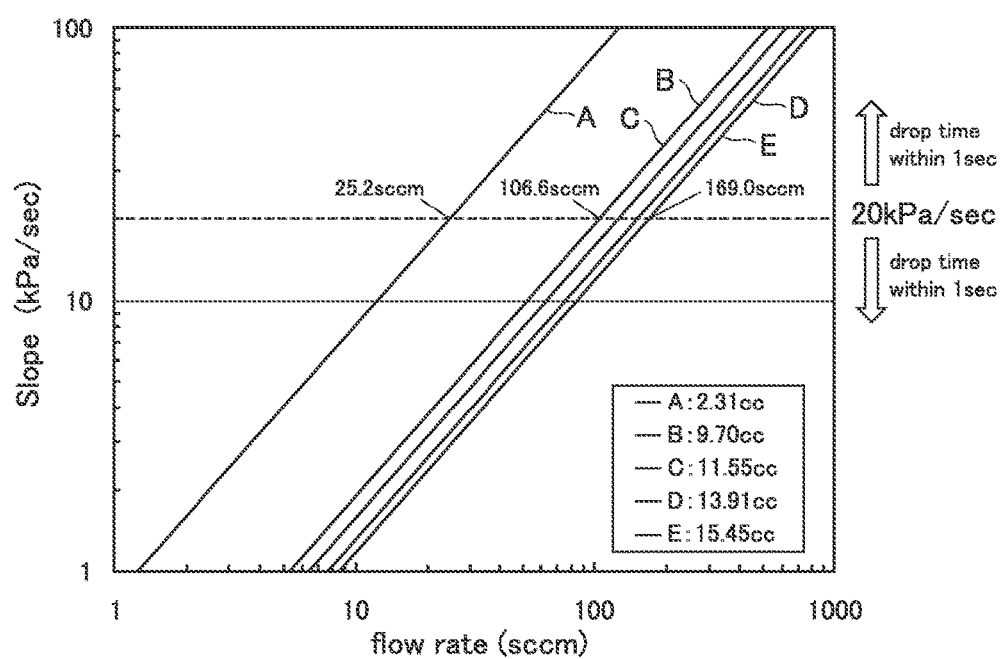
FIG. 17 A graph showing relationships respectively between gas flow rates SCCM and pressure drop rates kPa/sec in chambers A to E of the device previously developed when an available time for flow rate measurement is respectively within one second.
Figure 18:
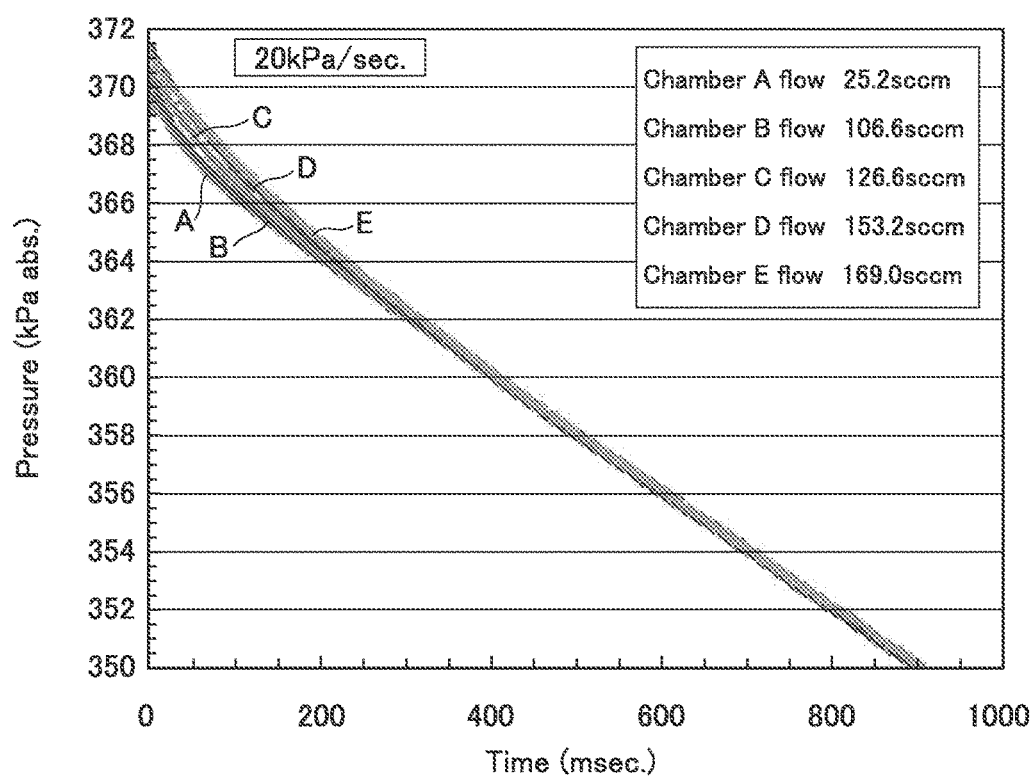
FIG. 18 A graph showing pressure drop characteristics of the chambers A to E of the device previously developed when a pressure drop rate is 20 kPa/sec.
Figure 19:
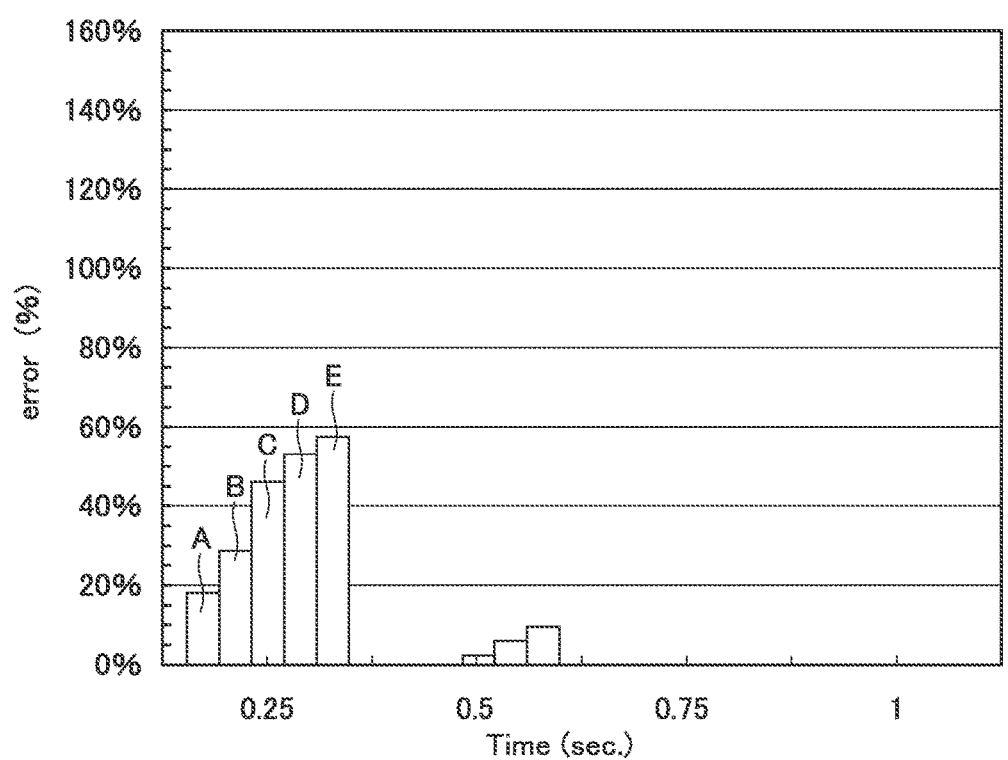
FIG. 19 A graph showing relationships respectively between elapsed times after closures of the inlet side (primary side) opening and closing switching valves AV of the chambers A to E and flow rate stabilities.
Figure 20:
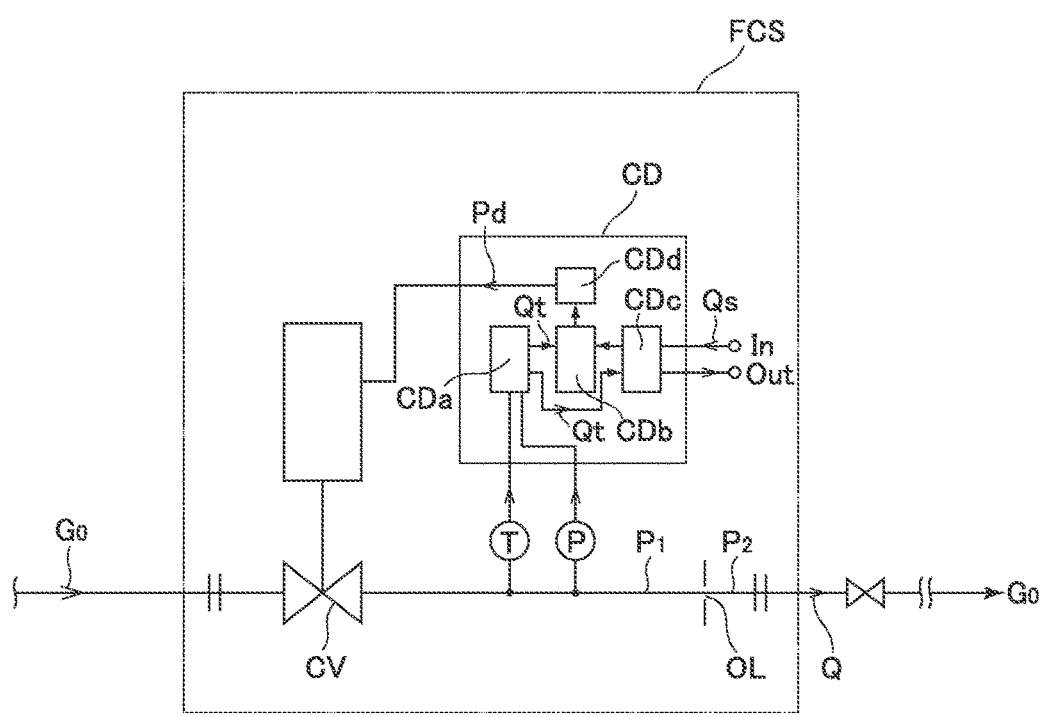
FIG. 20 A schematic diagram of a basic configuration of a conventional pressure-type flow rate control device.
Figure 21:
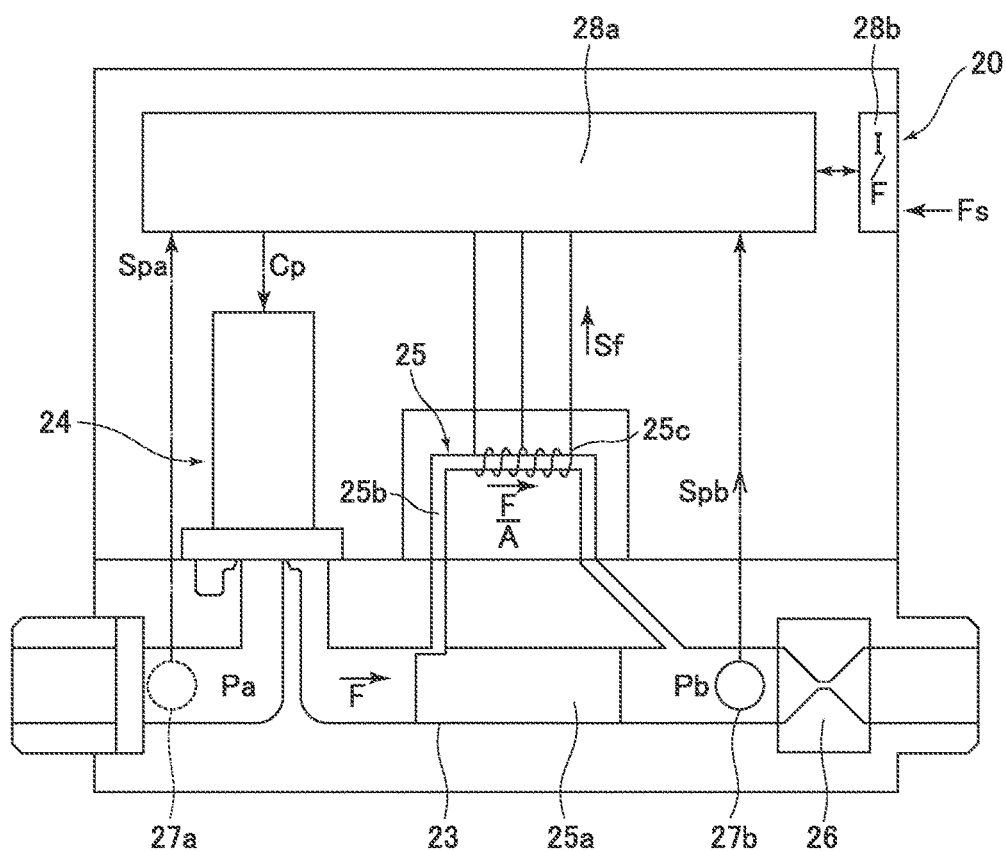
FIG. 21 A schematic diagram of a basic configuration of a conventional pressure-type flow rate control device provided with a flow rate monitor.

In FIGS. 1 to 3, the configuration is almost the same as a configuration of a pressure-type flow rate control device provided with a flow rate monitor shown in FIGS. 15 and 16 that was previously developed and what only different are that the monitoring flow rate computing control section CPb can be switched to output the build-down flow rate $Q_1$ for the larger flow rate range or to output the build-down flow rate $Q_2$ for the smaller flow rate range and the pressure sensor $P_3$ is provided to the connecting block $VB_5$ as shown in FIG. 3. Here in FIGS. 2 and 3, components such as a temperature detecting sensor T and a filter F are not shown. Furthermore, the pressure-type flow rate control section FCS can be any type and it of course can have only one orifice or three or more orifices. Since basic configurations of the pressure-type flow rate control section FCS and the build-down type flow rate monitoring section BDM are known, those are not described in detail here.

Referring to FIG. 1, in the present invention, the flow rate control device is configured to be switched between the flow rate monitoring for the larger flow rate range and the flow rate monitoring for the smaller flow rate range corresponding to the control flow rate of the gas, and in case the flow rate of the gas flowing from the gas inlet 1 is the larger flow rate $Q_1$ (for example, 40 to 600 SCCM), the pressure detection value $\Delta P_1$ is detected by the pressure sensor $P_3$ by keeping the outlet side switching valve $PV_2$ opened and opening and closing the inlet side switching valve PV 1, and then the monitoring flow rate $Q_1$ of the larger flow rate range is calculated by Formula 1 based on the pressure detection value $\Delta P_1$ and a build-down volume which is an internal volume of a pipeline between the inlet side switching valve $PV_1$ and the control valve CV of the pressure-type flow rate control section FCS.

On the other hand, in case the flow rate of the gas flowing from the gas inlet 1 is the smaller flow rate $Q_2$ (for example, 2.5 to 40 SCCM), the pressure detection value $\Delta P_2$ is detected by the pressure sensor $P_3$ by keeping the inlet side switching valve $PV_1$ opened and opening and closing the outlet side switching valve $PV_2$, and then the monitoring flow rate $Q_2$ of the smaller flow rate range is calculated by Formula 1 based on the pressure detection value $\Delta P_2$ and a build-down volume which is an internal volume of a pipeline between the outlet side switching valve $PV_2$ and the control valve CV of the pressure-type flow rate control section FCS.

Here, it is the same as in the previously developed pressure-type flow rate control device provided with the flow rate monitor that the flow rate $Q_1$ (or $Q_2$) calculated by the monitoring flow rate computing control section CPb is inputted to the set flow rate adjusting mechanism QSR of the flow rate control section FCS, the gas flowing out from the build-down type flow rate monitoring section BDM flows through the control valve CV, the small diameter orifice $OR_1$ and/or the large diameter orifice $OR_2$, and flows out from the gas outlet 2, the flow rate of the gas flowing through the orifice is calculated by the flow rate computing control section CPa to conduct the opening and closing operation of the control valve CV as well as an orifice switching valve OLV, and the monitoring flow rate $Q_1$ (or $Q_2$) from the build-down type flow rate monitoring section BDM is compared with the flow rate of the gas flowing through the orifice by the set flow rate adjusting mechanism QSR of the flow rate computing control section CPa and when a difference between those exceeds a prescribed value, the set flow rate Qs is adjusted to match the control flow rate of the flow rate control section FCS with the monitoring flow rate Q.

TABLE 4

| Monitoring flow rate (larger flow rate) 600-40 sccm Monitoring flow rate (smaller flow rate) 40-2.5 sccm | | | |
|---|---|---|---|
| build-down capacity | Pressure drop rate 5 kPa/sec | Pressure drop rate 80 kPa/sec | Valve operation |
| 1 cc | 2.73 sccm | 43.7 sccm | $PV_2$: open to close ($PV_1$: open state) |
| 14 cc | 38.2 sccm | 611.7 sccm | $PV_1$: open to close ($PV_2$: open state) |

Table 4 indicates a detecting result of the build-down flow rate, and when the inlet side switching valve $PV_1$ and the outlet side switching valve $PV_2$ were the piezoelectric driven valves, the build-down capacity for the smaller flow rate range $Q_2$ was set at 1 cc, the build-down capacity for the larger flow rate range $Q_1$ was set at 14 cc, and the pressure drop rates $\Delta P_2$/sec and $\Delta P_1$/sec were respectively set at 5 Kpa and 80 Kpa, the resulting monitoring flow rate for the smaller flow rate range $Q_2$ was between 2.73 to 43.7 SCCM and the resulting monitoring flow rate for the larger flow rate range $Q_1$ was between 38.2 to 611.7 SCCM.

Here, the output of the monitoring flow rate was conducted no less than once per second and the temperature detecting sensor T (not shown) was a thermostat type thermometer inserted into the monitor block $VB_1$ or $VB_1$. The build-down capacity for the larger flow rate range and the build-down capacity for the smaller flow rate range were respectively formed by an internal volume of the chamber as well as the pipeline and by only an internal volume of the pipeline.

Figure 4:
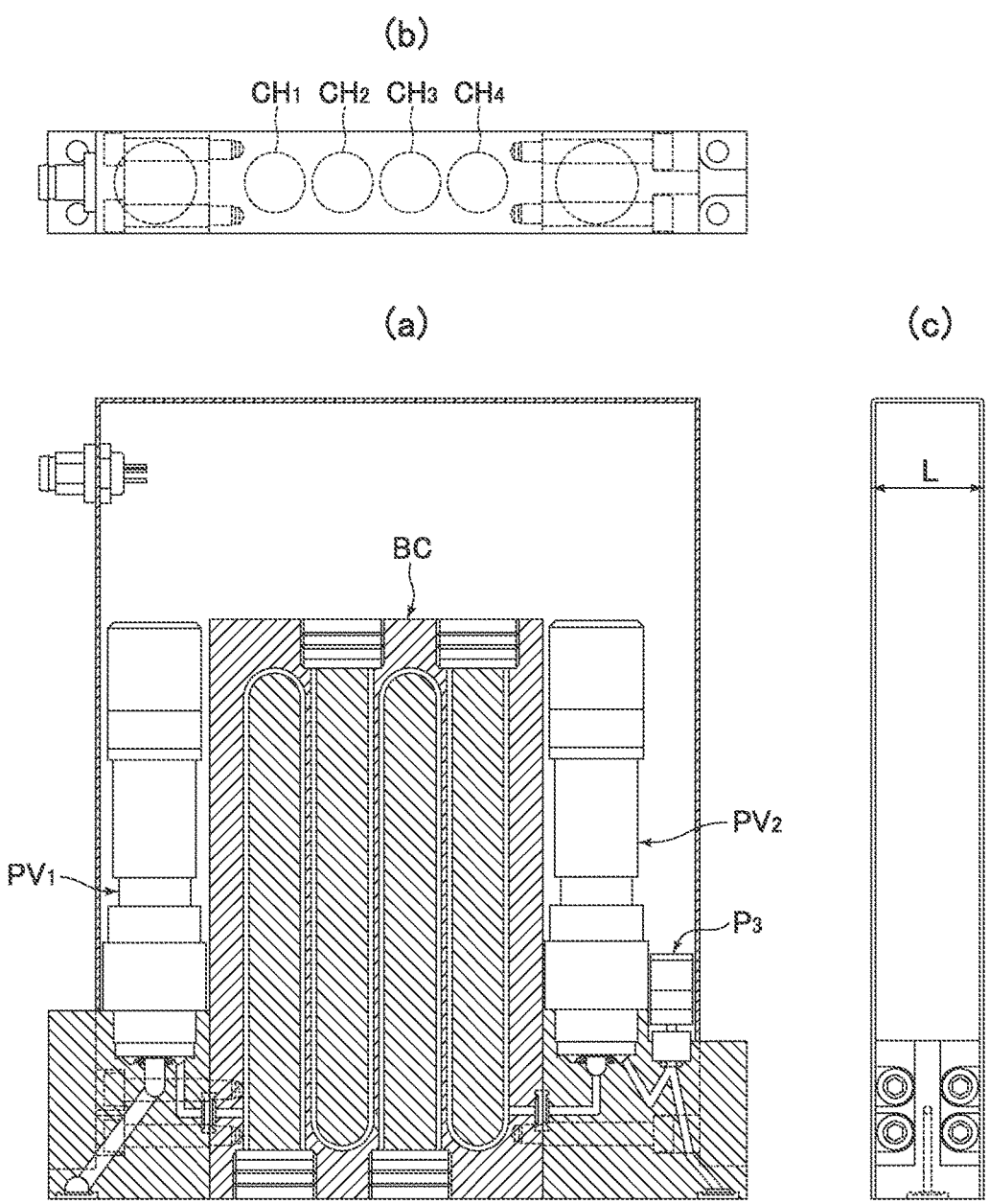
FIG. 4 A schematic longitudinal sectional view of a pressure-type flow rate control device provided with a build-down type flow rate range switching type flow rate monitor according to a second embodiment of the present invention.
Figure 5:
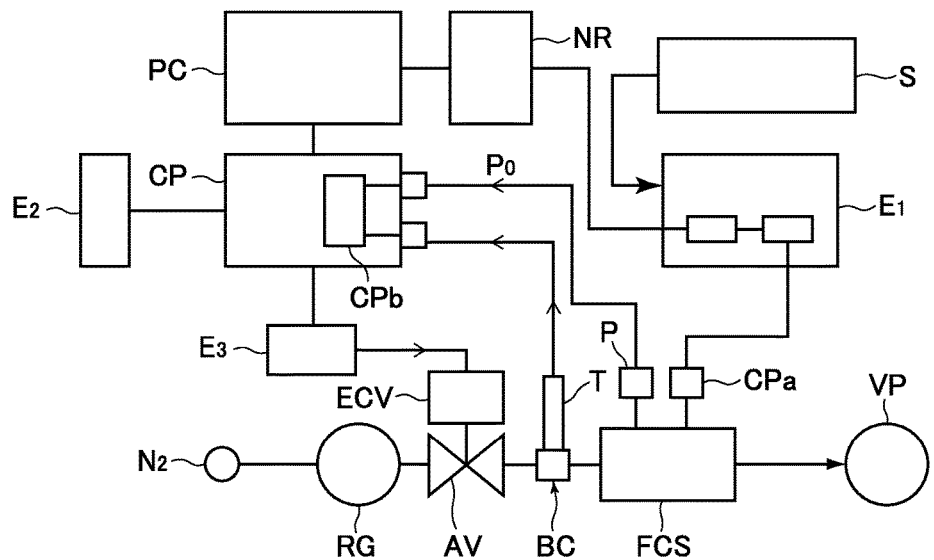
FIG. 5 A schematic diagram of a configuration of a testing device for measuring a flow rate monitoring characteristic of the flow rate control device provided with the build-down type flow rate monitor.
Figure 6:
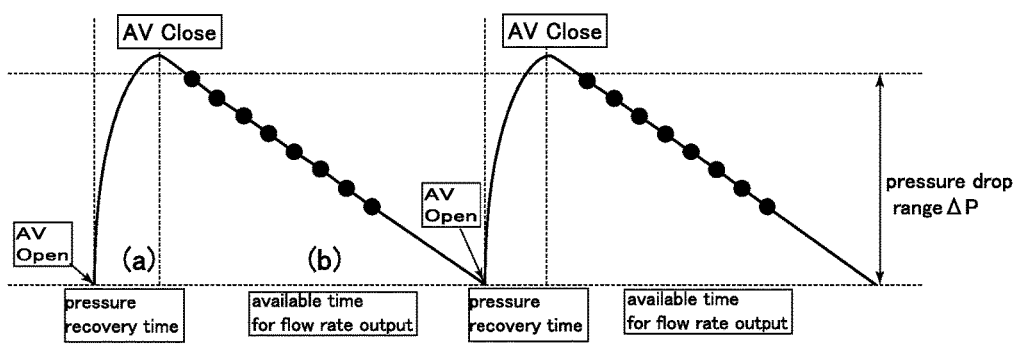
FIG. 6 A diagram showing a pressure drop status of the build-down type flow rate monitor.
Figure 7:
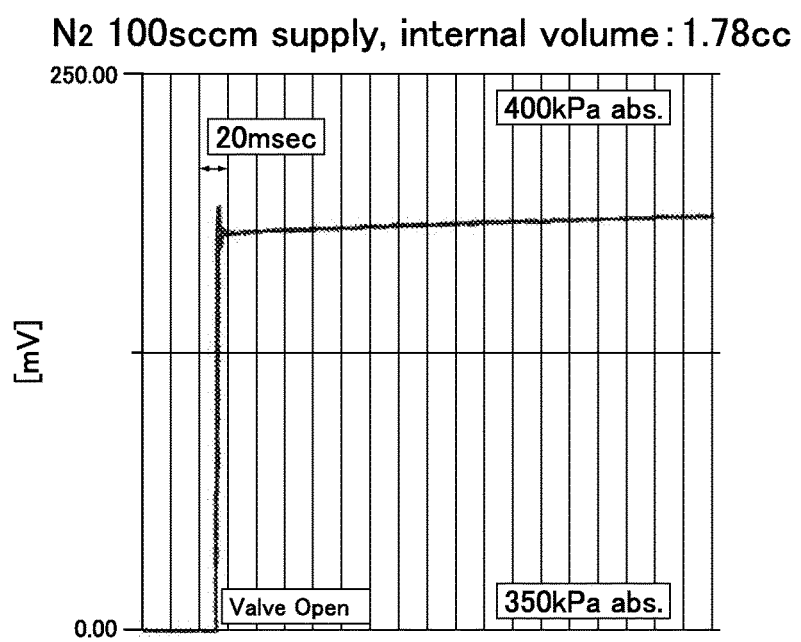
FIG. 7 A diagram showing an example of a curb showing a pressure recovery characteristic when the build-down flow rate measurement is conducted.
Figure 8:
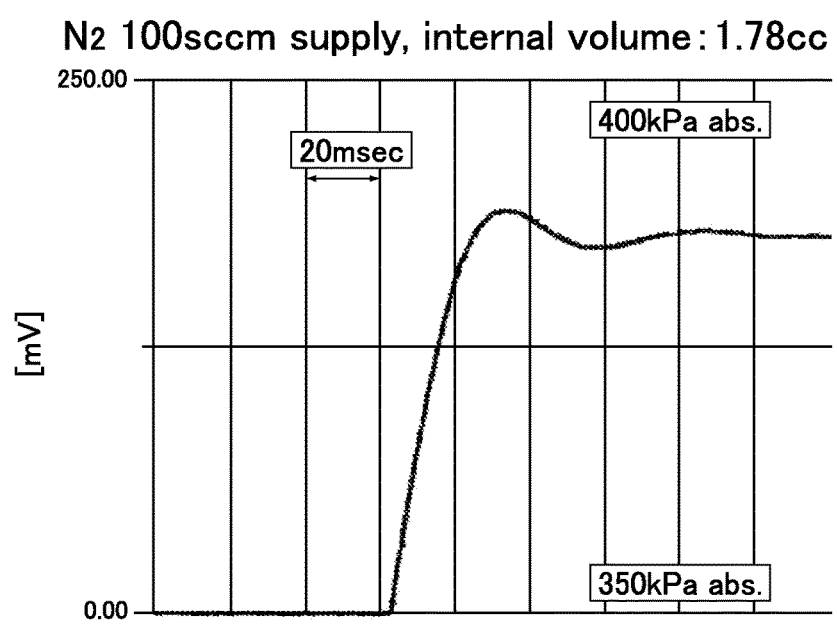
FIG. 8 A partial enlarged view of FIG. 5.
Figure 9:
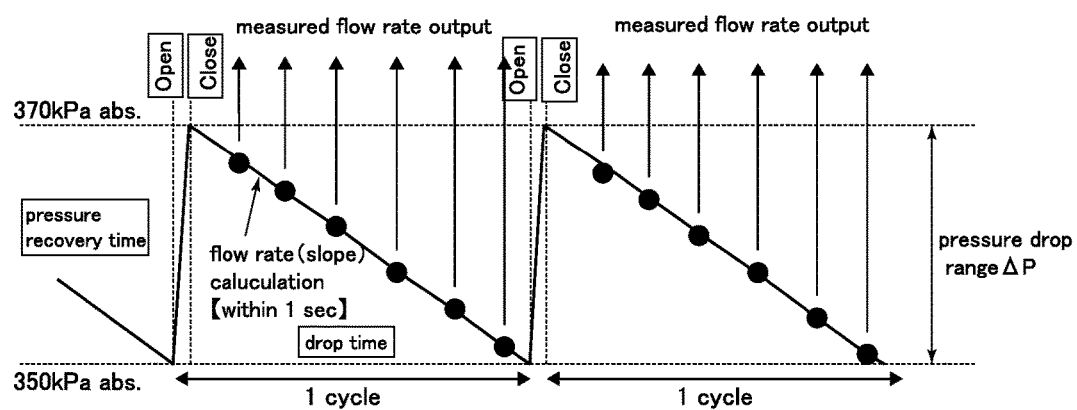
FIG. 9 A curb showing a pressure recovery characteristic in test 1.
Figure 10:
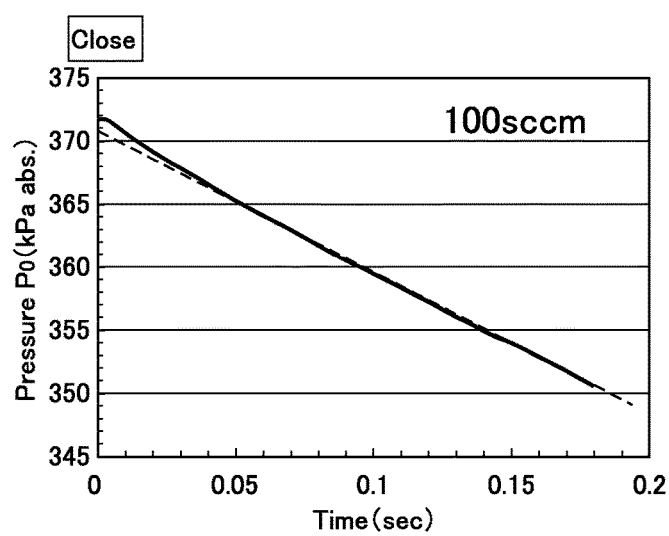
FIG. 10 A curb showing a pressure drop characteristic (control flow rate at 100 SCCM).
Figure 11:
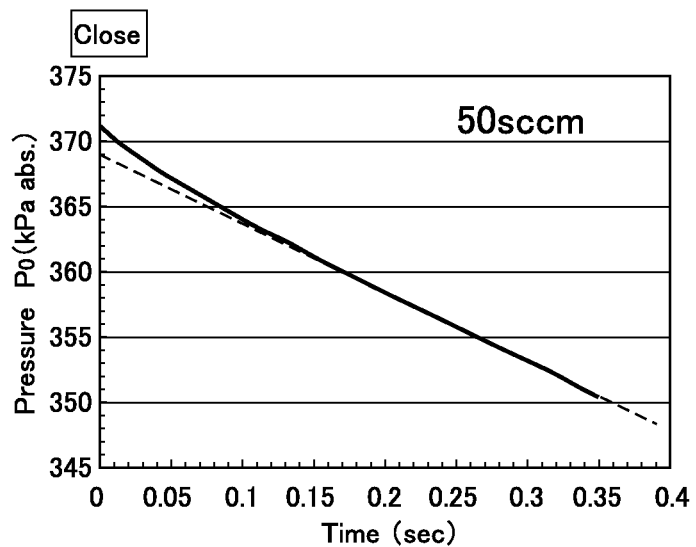
FIG. 11 A curb showing a pressure drop characteristic (control flow rate at 50 SCCM).
Figure 12:
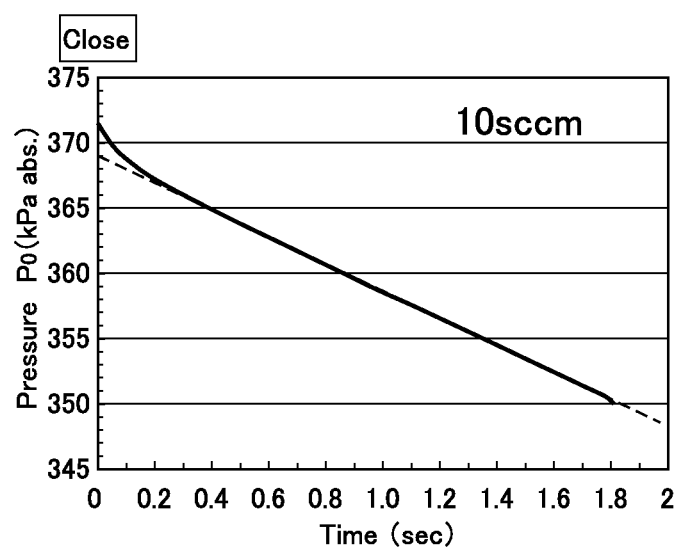
FIG. 12 A curb showing a pressure drop characteristic (control flow rate at 10 SCCM).
Figure 13:
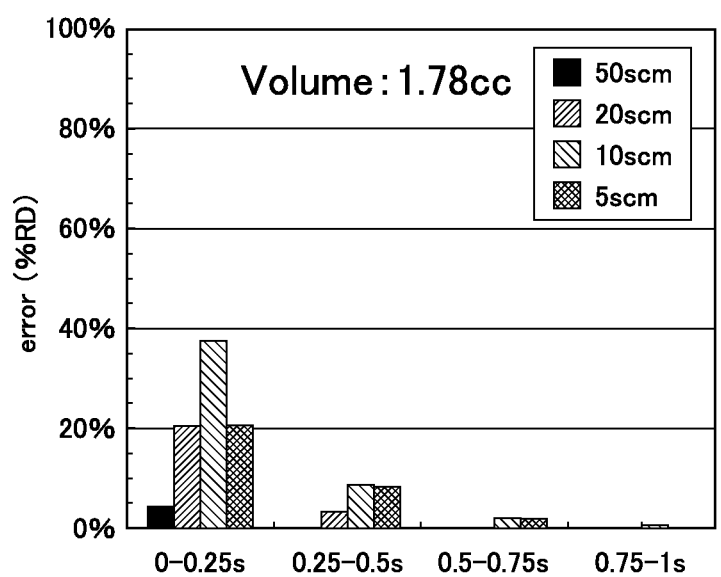
FIG. 13 A graph showing a relationship between an elapsed time after closure of a primary side opening and closing switching valve (upstream side valve) AV and a flow rate stability (build-down capacity at 1.78 cc).
Figure 14:
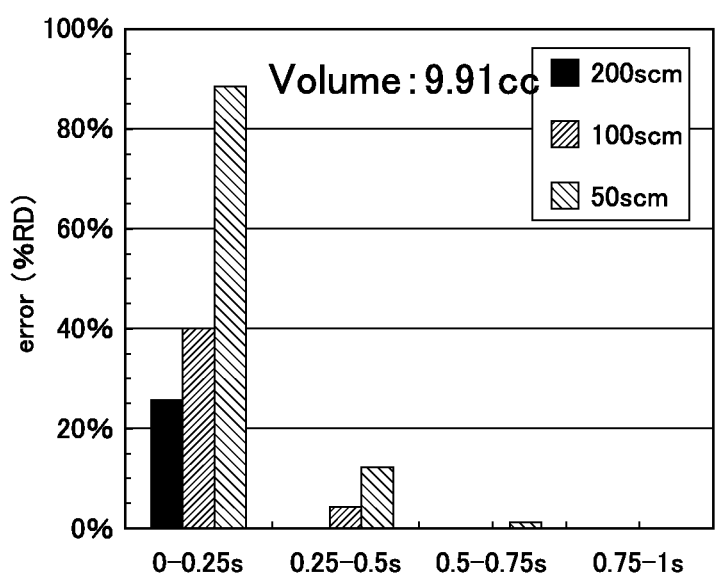
FIG. 14 A graph showing a relationship between an elapsed time after closure of the primary side opening and closing switching valve (upstream side valve) AV and a flow rate stability (build-down capacity at 9.91 cc).

FIGS. 4(*a*) to (*c*) illustrate a second embodiment of the present invention and (a) is a schematic longitudinal sectional view, (b) is a plain view, and (c) is a right side view. A pressure-type flow rate control device provided with a flow rate range switching type flow rate monitor according to the second embodiment of the present invention includes a build-down capacities BC formed by four small diameter chambers $CH_1$, $CH_2$, $CH_3$, and $CH_4$ that are vertically arranged in parallel, and a configuration of the each small diameter chamber is the same as a configuration of the build-down capacity BC of the first embodiment and a gap between an outer cylinder and an inner cylinder is a gas flow passage.

Furthermore, the four small diameter chambers $CH_1$ to $CH_4$ are connected with the gas flow passages, each of which is formed between the each inner cylinder and the outer cylinder, being connected each other in series to form the build-down capacity BC with a small internal volume of V.

As shown in FIG. 4, since the flow rate control device provided with the flow rate range switching type flow rate monitor according to the second embodiment of the present invention has a thickness dimension L of about 10 to 13 mm, a pressure sensor with a small dimension 10 to 13 mm is used as the pressure sensor $P_3$ provided to a downstream side of the outlet side opening and closing switching valve $PV_2$. Here, a structure and a function of the device according to the second embodiment are not described as those are the same as in the case of the first embodiment.

INDUSTRIAL APPLICABILITY

A pressure-type flow rate control device according to the present invention may be widely used for a gas supplying device for chemical product manufacturing equipment but not only for a gas supplying device for semiconductor manufacturing equipment as long as it has an orifice and/or a critical nozzle.

A REFERENCE SIGNS LIST

BDM build-down type flow rate monitoring section
FCS flow rate control section (pressure-type flow rate control device)
AV primary side opening and closing switching valve (upstream side valve)
BC build-down capacity
V build-down volume
RG pressure regulator
$N_2$ $N_2$ supply source
T temperature sensor (resistance thermometer)
$P_1$, $P_2$ pressure sensor
$P_3$ pressure sensor
$\Delta P_1$, $\Delta P_2$ pressure detection value
CV control valve
OR orifice
$OR_1$ small diameter orifice
$OR_2$ large diameter orifice
OIP external input output circuit
OLV orifice switching valve
$VB_1$ inlet side block of a monitor
$VB_2$ outlet side block of a monitor
$VB_3$ inlet side block of a flow rate control section
$VB_4$ outlet side block of a flow rate control section
$VB_5$ gasket of a connecting portion
CT signal transmission circuit (digital communication circuit)
CP computing control section
CPa flow rate computing control section
CPb monitoring flow rate computing control section
$E_1$ power source for a flow rate control device
$E_2$ power source for a computing control section
$E_3$ power source for an electromagnetic valve
ECV electric driving section
NR data logger
S signal generator
PC computing display section
$PV_1$ inlet side switching valve (inlet side piezo switching valve)
$PV_2$ outlet side switching valve (outlet side piezo switching valve)
$L_1$ passage at a gas inlet side of an inlet side switching valve
$L_2$ passage at a gas outlet side of an inlet side switching valve
$L_3$ passage at a gas inlet side of an outlet side switching valve
$L_4$ passage at a gas outlet side of an outlet side switching valve Cu brass bar
$Q_1$, $Q_2$ monitoring flow rate (build-down flow rate)
CH chamber
$CH_1$ to $CH_4$ small diameter chamber
CHa outer cylinder
CHb inner cylinder
L thickness dimension of a device
QsR predetermined flow rate adjusting mechanism
Qs predetermined flow rate
Qs' adjusted flow rate
1 gas inlet
2 gas outlet
$CH_1$ to $CH_4$ small diameter chamber

The invention claimed is:

1. A flow meter, comprising an inlet side opening and closing switching valve provided on a flow passage, an outlet side opening and closing switching valve provided to a downstream side of the inlet side opening and closing switching valve, and a control valve provided to a downstream side of the outlet side opening and closing switching valve that are connected with each other by flow passages having internal volumes, and a pressure sensor provided to an upstream side of the control valve,
wherein the flow meter also comprises a larger flow rate measuring section for calculating a flow rate based on a first build-down volume which is an internal volume of the flow passage between an outlet side of the inlet side opening and closing switching valve and an inlet side of the control valve, and a smaller flow rate measuring section for calculating a flow rate based on a second build-down volume which is an inner capacity of the flow passage between an outlet side of the outlet side opening and closing switching valve and the inlet side of the control valve.

2. The flow meter according to claim 1, wherein the control valve is a control valve in a flow rate control section.

3. The flow meter according to claim 1, wherein the plurality of flow passages having the internal volumes which are separated by the opening and closing switching valves are provided.

4. A flow rate control device comprising a build-down type flow rate monitoring section provided to an upstream side, and a flow rate control section provided to a downstream side of the build-down type flow rate monitoring section,
wherein the build-down type flow rate monitoring section includes an inlet side opening and closing switching valve, a build-down capacity provided to a downstream side of the inlet side opening and closing switching valve, a temperature sensor provided to a gas passage at a downstream side of the build-down capacity, an outlet side opening and closing switching valve provided to the downstream side of the build-down capacity, a pressure sensor provided to a downstream side of the outlet side opening and closing switching valve, and a monitoring flow rate computing control section to which detected values by the temperature sensor as well as the pressure sensor are inputted, and calculates a flow rate for a larger flow rate range based on an internal volume of a gas passage between an outlet side of the inlet side opening and closing switching valve and a control valve of the flow rate control section as a larger build-down volume and also calculates a monitoring flow rate for a smaller flow rate range based on an internal volume of a gas passage between an outlet side of the outlet side opening and closing switching valve and the control valve of the flow rate control section as a smaller build-down volume.

5. The flow rate control device according to claim 4, wherein the build-down type flow rate monitoring section and the flow rate control section are connected by a signal transmission circuit for transmitting the monitoring flow rate from the build-down type flow rate monitoring section to the flow rate control section, and a set flow rate adjusting mechanism is provided in the flow rate control section to adjust a set flow rate of the flow rate control section based on the monitoring flow rate transmitted from the build-down type flow rate monitoring section.

6. A flow rate control device comprising a build-down type flow rate monitoring section provided to an upstream side, a flow rate control section having control valve provided to a downstream side of the build-down type flow rate monitoring section, a signal transmission circuit connecting the build-down type flow rate monitoring section and the flow rate control section to transmit a monitoring flow rate from the build-down type flow rate monitoring section to the flow rate control section, and a set flow rate adjusting mechanism adjusting a set flow rate of the flow rate control section based on the monitoring flow rate transmitted from the build-down type flow rate monitoring section, wherein the build-down type flow rate monitoring section comprises an inlet side opening and closing switching valve releasing and stopping gas supply from a gas source, a build-down capacity with a predetermined internal volume connected to an outlet side of the inlet side opening and closing switching valve, an outlet side opening and closing switching valve connected to an outlet side of the build-down capacity, a pressure sensor detecting a pressure of gas flowing through a passage at a downstream side of the outlet side opening and closing switching valve, a temperature sensor detecting a temperature of the gas flowing through the passage at the upstream side of the outlet side opening and closing switching valve, and a monitoring flow rate computing control section calculating and outputting a monitoring flow rate for a larger flow rate range by using a first build-down method in case of the larger flow rate by opening the inlet side opening and closing switching valve to increase a gas pressure in a first build-down capacity to a set pressure upper limit value then closing the inlet side opening and closing switching valve to decrease the gas pressure in the first build-down capacity to a set pressure lower limit value after a predetermined time with the outlet side opening and closing switching valve kept opened and the inlet side opening and closing switching valve operated to be opened and closed where the first build-down capacity is an internal volume of a gas passage between the outlet side of the inlet side opening and closing switching valve and the control valve of the flow rate control section, and also calculating and outputting a monitoring flow rate for a smaller flow rate range by using a second build-down method in case of the smaller flow rate by opening the outlet side opening and closing switching valve to increase the gas pressure in a second build-down capacity to a set pressure upper limit value then closing the outlet side opening and closing switching valve to decrease the gas pressure to a set pressure lower limit value after a predetermined time with the inlet side opening and closing switching valve kept opened and the outlet side opening and closing switching valve operated to be opened and closed where the second build-down capacity is an internal volume of a gas passage between the outlet side of the outlet side opening and closing switching valve and the control valve of the flow rate control section, and here, the monitoring flow rates for both the larger flow rate and the smaller flow rate are calculated by a following formula:

$$Q = \frac{1000}{760} \times 60 \times \frac{273}{(273+T)} \times V \times \frac{\Delta p}{\Delta t} \quad \text{[Formula 3]}$$

(Provided that, Q represents the monitoring flow rate, T represents a gas temperature (° C.), V represents the first or second build-down capacity (1), $\Delta P$ represents a pressure drop range (set pressure upper limit value —set pressure lower limit value) (Torr), and $\Delta t$ represents the time (sec) between the close and open of the inlet side opening and closing switching valve.

7. The flow rate control device according to claim 6, wherein the set flow rate adjusting mechanism includes a comparator comparing the monitoring flow rate and the set flow rate, and the set flow rate is automatically adjusted to the monitoring flow rate in case a difference between the monitoring flow rate and the set flow rate exceeds a prescribed value.

8. The flow rate control device according to claim 6, which is a pressure fluctuation proof pressure-type flow rate control device, wherein the flow rate control section comprises the control valve, an orifice or a critical nozzle, a pressure meter provided to an upstream side of the orifice or the critical nozzle, and a flow rate computing control device.

9. The flow rate control device according to claim 6, which is a pressure fluctuation proof pressure-type flow rate control device, wherein the flow rate control section comprises the control valve, an orifice or a critical nozzle, a pressure meter provided to an upstream side of the orifice or the critical nozzle, a pressure meter provided to a downstream side of the orifice or the critical nozzle, and a flow rate computing control device.

10. The flow rate control device according to claim 6, wherein the build-down capacity is configured to be 0.5 to 20cc, the set pressure upper limit value is configured to be 400 to 100kPa abs, the set pressure lower limit value is configured to be 350 to 50kPa abs, and the predetermined time is configured to be 0.5 to 5 seconds.

11. The flow rate control device according to claim 6, wherein the internal volume of the gas passage between the outlet side of the inlet side opening and closing switching valve and the control valve of the flow rate control section is configured to be 13 to 15cc, the monitoring flow rate range for the larger flow rate is configured to be 40 to 600SCCM, and the monitoring flow rate range for the smaller flow rate is configured to be 1 to 50SCCM.

12. The flow rate control device according to claim 6, wherein the inlet side opening and closing switching valve is a piezoelectric driven metal diaphragm valve or a linear motion electromagnetic valve, and a recovery time for the gas pressure to recover from the set pressure lower limit to the set pressure upper limit by opening the inlet side opening and closing switching valve is configured to be shorter than a pressure drop time for the gas pressure to drop from the set pressure upper limit to the set pressure lower limit by closing the inlet side opening and closing switching valve.

13. The flow rate control device according to claim 8, wherein the flow rate computing control device of the flow rate control section and a monitoring flow rate computing control device of the build-down type flow rate monitoring section are integrally formed.

14. The flow rate control device according to claim 9, wherein the flow rate computing control device of the flow rate control section and the monitoring flow rate computing control device of the build-down type flow rate monitoring section are integrally formed.

15. The flow rate control device according to claim 6, wherein the build-down capacity is provided in the form of a chamber with a structure having an inner cylinder and an outer cylinder concentrically fixed, and a gap between the inner cylinder and the outer cylinder forming the chamber is a gas passage.

16. The flow rate control device according to claim 6, wherein the build-down capacity is provided in the form of a plurality of chambers arranged in parallel each of which has a structure having an inner cylinder and an outer cylinder concentrically provided and fixed, and a gap between the each inner cylinder and the outer cylinder is a gas passage, then the gas passages of the chambers are connected in parallel.

* * * * *